(12) United States Patent
Lyons et al.

(10) Patent No.: US 6,771,356 B1
(45) Date of Patent: Aug. 3, 2004

(54) SCATTEROMETRY OF GRATING STRUCTURES TO MONITOR WAFER STRESS

(75) Inventors: Christopher F. Lyons, Fremont, CA (US); Bhanwar Singh, Morgan Hill, CA (US); Steven C. Avanzino, Cupertino, CA (US); Khoi A. Phan, San Jose, CA (US); Bharath Rangarajan, Santa Clara, CA (US); Ramkumar Subramanian, Sunnyvale, CA (US); Cyrus E. Tabery, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 403 days.

(21) Appl. No.: 10/050,626

(22) Filed: Jan. 16, 2002

(51) Int. Cl.$^7$ .............................................. G01B 11/16
(52) U.S. Cl. ......................... 356/32; 356/237.5; 438/7; 438/16
(58) Field of Search ............................. 356/32, 237.4, 356/237.5; 438/7, 8, 9, 16

(56) References Cited

U.S. PATENT DOCUMENTS 3,184,961 A * 5/1965 Bell ............................ 356/32
4,408,884 A * 10/1983 Kleinknecht et al. ........ 356/496

\* cited by examiner

*Primary Examiner*—F. L. Evans
(74) *Attorney, Agent, or Firm*—Amin & Turocy, LLP

(57) ABSTRACT

A system for monitoring a fabrication process is provided. The system includes one or more light sources, each light source directing light to one or more gratings on a wafer. Light reflected from the gratings is collected by a measuring system that processes the collected light. The collected light is indicative of distortion due to stress at respective portions of the wafer. The measuring system provides distortion/stress related data to a processor that determines the acceptability of the distortion of the respective portions of the wafer. The collected light may be analyzed by scatterometry systems to produce scatterometry signatures associated with distortion and to produce feed-forward control information that can be employed to control semiconductor fabrication processes.

18 Claims, 30 Drawing Sheets

SURFACE
NORMAL

SPECULARLY
REFLECTED
BEAM

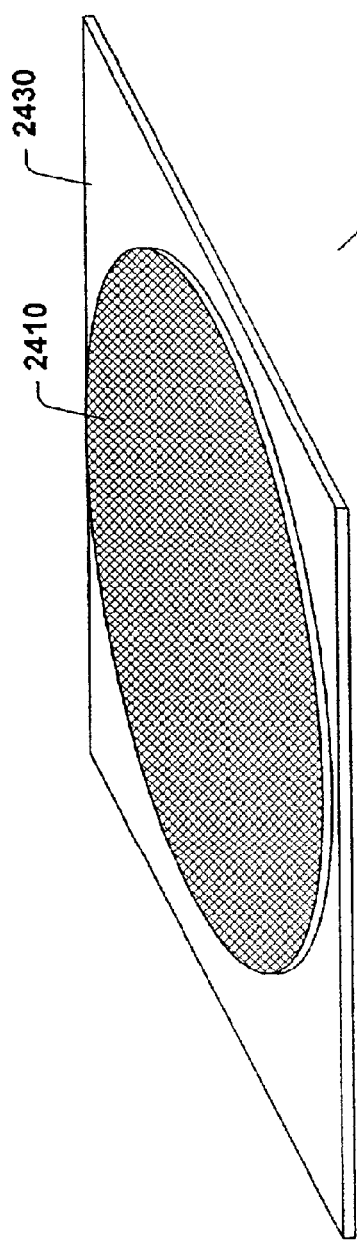
Fig. 24
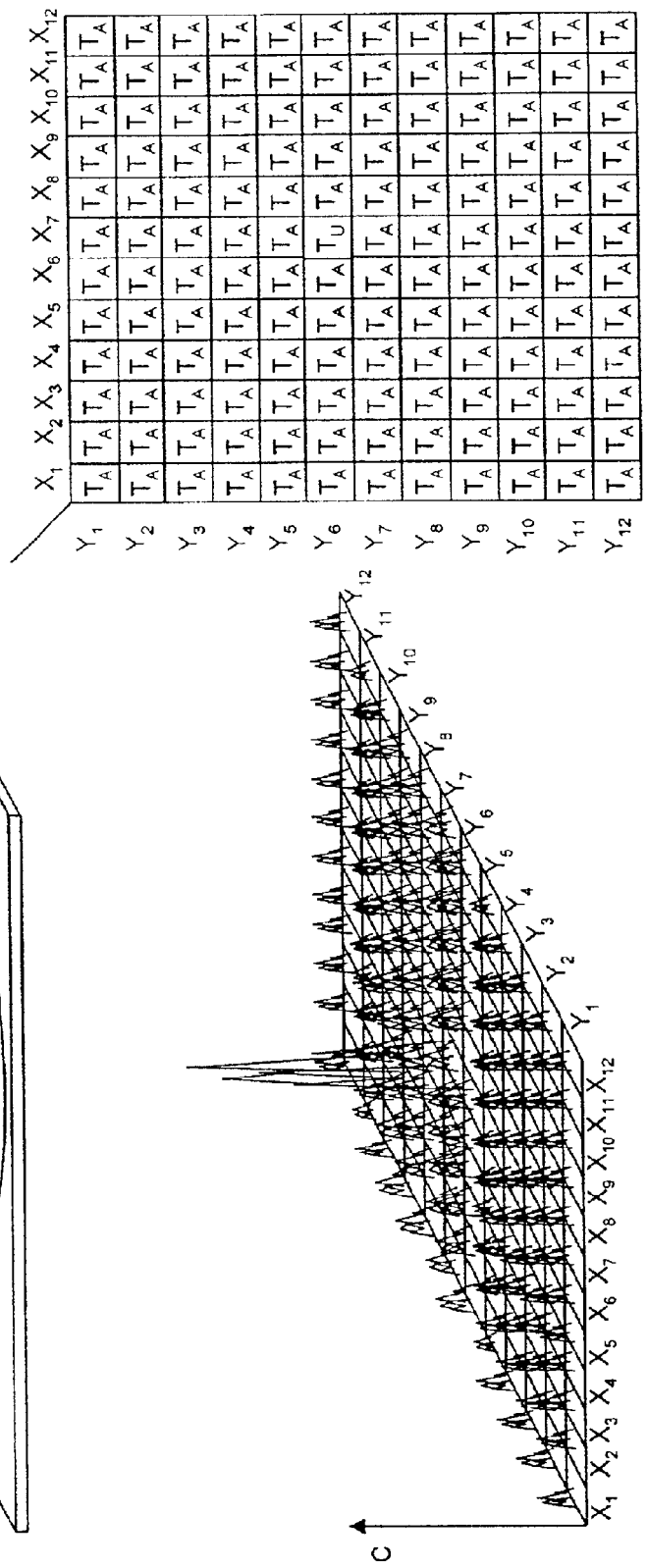
Fig. 26
Fig. 25

SCATTEROMETRY OF GRATING STRUCTURES TO MONITOR WAFER STRESS

TECHNICAL FIELD

The present invention generally relates to monitoring semiconductor fabrication processes, and in particular to a system and method for monitoring wafer stresses by real-time, in-situ scatterometry analysis of grating distortion measurements.

BACKGROUND

In the semiconductor industry, device densities continue to increase and thus, there have been, and continue to be, efforts toward scaling down device dimensions (e.g., at sub-micron levels) on semiconductor wafers. In order to scale down device dimensions (e.g., width and spacing of interconnecting lines, spacing and diameter of contact holes, surface geometry such as corners and edges) of various features, more precise control of fabrication processes are required. The dimensions of and between features can be referred to as critical dimensions (CDs). Reducing CDs, and reproducing more accurate CDs facilitates achieving higher device densities through scaled down device dimensions. However, stresses on materials (e.g., thin films) employed in semiconductor manufacturing can create problems that make achieving reduced and more accurate CDs more difficult.

The process of manufacturing semiconductors, or integrated circuits (commonly called ICs, or chips), typically includes more than a hundred steps, during which hundreds of copies of an integrated circuit may be formed on a single wafer. At each step, stresses placed on materials like thin films may affect the CDs on the ICs if such stresses lead to distortion of the materials and/or features fabricated into the materials. Generally, the manufacturing process involves creating several patterned layers on and into the substrate that ultimately forms the complete integrated circuit. This layering process creates electrically active regions in and on the semiconductor wafer surface. The layer to layer orientation, location, size, shape and isolation of such electrically active regions, and thus the reliability and performance of integrated circuits employing such regions depend, at least in part, on the precision with which features can be placed on a wafer. Unfortunately, commonly used fabrication processes generate stresses that may cause distortion in features placed on a wafer. Conventional fabrication systems check for distortion (e.g., bow, warp, misalignment, stretching, compressions) near or at the end of fabrication, or at pre-scheduled time intervals. These types of end-point and interval detection methods can be problematic for several reasons. For example, at late stages in the fabrication process, the presence of an unacceptable distortion may render the whole semiconductor device unusable, forcing it to be discarded. In addition, post-fabrication detection/quality control data do not provide a user with real-time information related to the device being fabricated, and thus opportunities to study a fabrication process to determine when, how, and why stresses are being generated are missed. Post-fabrication data may only allow an estimation or a projection as to what adjustments are needed to correct the fabrication process. Such estimations and/or projections concerning necessary adjustments may lead to continued or recurring fabrication errors. Moreover, such a lengthy adjustment process may cause subsequent fabricated wafers to be wasted in the hopes of mitigating errors.

Visual inspection methods have been important in analyzing integrated circuit manufacture. Visually inspecting wafers is well-known in the art. While visual inspection techniques may be simple to implement, they are difficult to automate, and do not provide in-situ opportunities for process monitoring and/or study. Further, visual techniques employing scanning electron microscopes (SEM) and atomic force microscopes (AFM) can be expensive, time-consuming and/or destructive.

Thus, an efficient system, and/or method, to monitor stresses and resulting distortions during IC fabrication is desired to facilitate manufacturing ICs exhibiting desired critical dimensions.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. Its sole purpose is to present some concepts of the invention in a simplified form as a prelude to the more detailed description that is presented later.

The present invention provides a system and method for directly measuring distortions due to stresses during IC fabrication processes in-situ, for storing such measurements for future study and ex-situ adaptations of fabrication processes and for feeding forward control information based on scatterometry analysis of such direct measurements so that fabrication processes can be adapted.

In accordance with one aspect of the present invention, one or more test gratings are formed on a wafer, and thus, during fabrication processes, the test grating can be probed by a scatterometry beam. The light reflected and/or refracted from the test grating can be employed to extract distortion, CD and evolving profile information. The data can be stored to facilitate studying and thus adapting, ex-situ, such fabrication processes. If unacceptable distortion occurs and/or target CDs are not achieved, then the wafer may be marked for reworking and/or discarded. In another aspect of the present invention, the data is employed to produce adaptation control data that can be fed forward, in-situ, to facilitate adapting the fabrication processes.

In accordance with another aspect of the present invention, a system for monitoring and/or controlling semiconductor fabrication processes is provided. The system includes a system for directing light toward gratings located on a wafer, a fabrication monitoring system operable to measure light reflected from the gratings and to produce distortion measurement data and a distortion measurement data store for storing distortion data measurements. The system also includes a processor operatively coupled to the fabrication monitoring system. The processor receives the distortion measurement data from the fabrication monitoring system and records the distortion measurement data in the distortion data store. In one example of the present invention, the fabrication monitoring system further includes a scatterometry system for processing the light reflected from the one or more gratings, at least one fabrication component operable to perform one or more semiconductor fabrication steps on a wafer; and a fabrication component driving system for driving the at least one fabrication component.

Yet another aspect of the present invention provides a method for monitoring a semiconductor fabrication process. The method includes logically partitioning a wafer into portions, fabricating gratings on the wafer, directing an incident light onto the gratings, collecting a reflected light reflected from the gratings, measuring the reflected light to determine distortion measurements associated with the gratings and storing the distortion measurements. In one example of the present invention, the method further includes computing fabrication process adjustments by comparing the distortion measurements to scatterometry signatures associated with stored distortion measurements and adjusting fabrication processes based, at least in part, on the fabrication process adjustments.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

FIG. 24 is a perspective illustration of a wafer that may be monitored in accordance with an aspect of the present invention.

FIG. 25 is a representative three-dimensional grid map of a wafer illustrating measurements taken in accordance with an aspect of the present invention.

FIG. 26 is a measurement table correlating the measurements of FIG. 25 with desired measurement values accordance with the present invention.

DETAILED DESCRIPTION OF THE INVENTION

Figure 1:
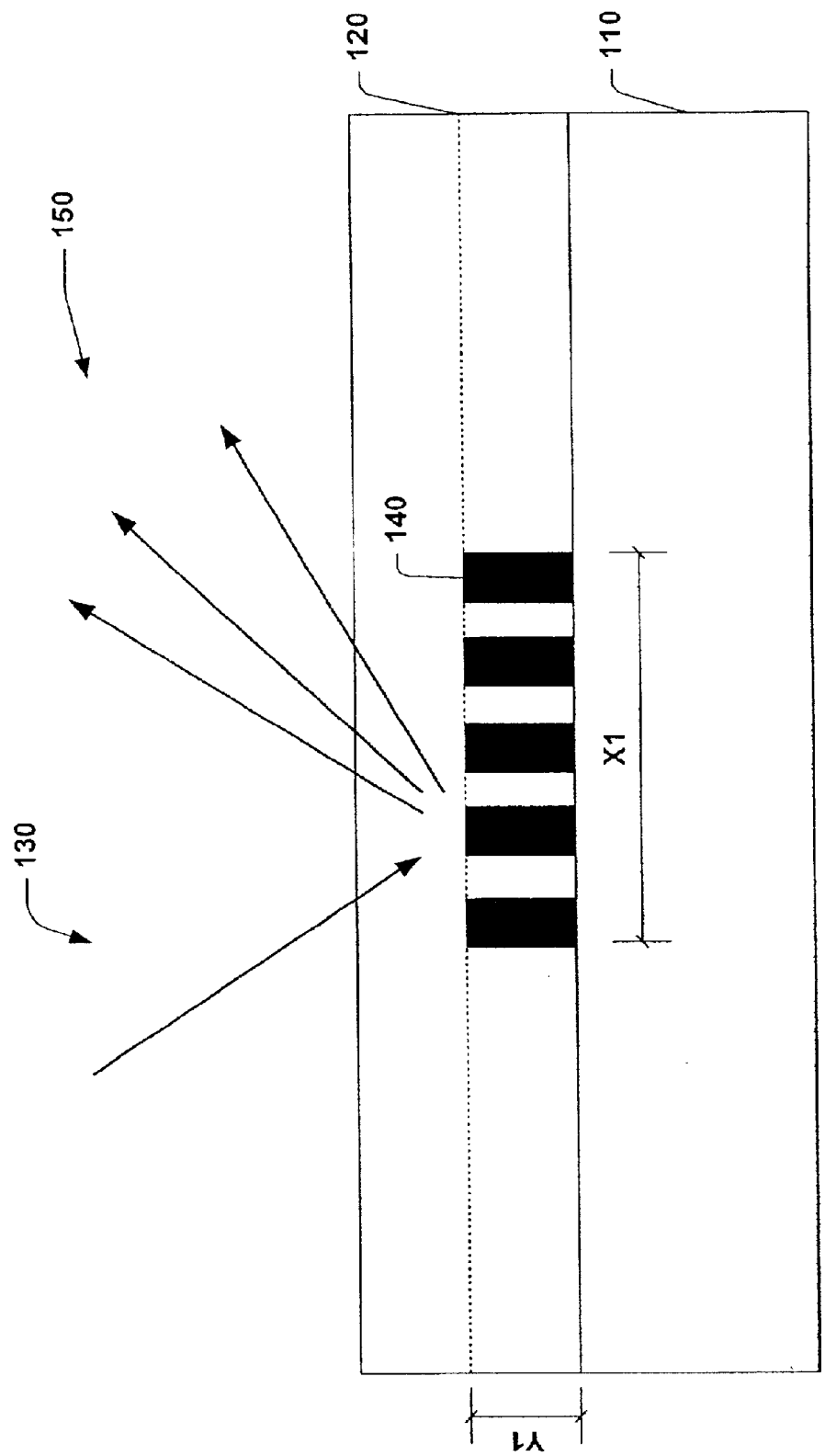
FIG. 1 illustrates a reference beam being reflected and/or refracted by a grating on a wafer, in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

The term "component" refers to a computer-related entity, either hardware, a combination of hardware and software, software, or software in execution. For example, a component may be a process running on a processor, a processor, an object, an executable, a thread of execution, a program and a computer. By way of illustration, both an application running on a server and the server can be components. By way of further illustration, both a spin track and a process controlling a spin track can be components.

It is to be appreciated that various aspects of the present invention may employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks and function link networks) may be employed.

Referring initially to FIG. 1, a reference beam 130 being reflected and/or refracted by a grating 140 on a wafer is illustrated. The wafer may include, for example, a substrate layer 110 and a thin film layer 120. The grating 140 may initially have a vertical dimension Y1 and a horizontal dimension X1. However, stresses applied to the thin film layer 120 may lead to distortions in the grating 140. For example, the grating 140 may be stressed and thus stretched, compressed and/or shifted vertically and/or horizontally. The angle, phase and/or intensity of one or more reflected and/or refracted beams 150 will depend, at least in part, on parameters associated with the grating 140. For example, the grating line width, grating line depth, grating line location, space between one or more grating lines, space between one or more gratings and grating location may affect the angle, phase and/or intensity of the one or more reflected and/or refracted beams 150. Thus, a library of scatterometry signatures associated with variously reflected and/or refracted beams, and the angle, phase and/or intensity of such reflected and/or refracted beams can be created, which facilitates determining whether a grating is in a desired location and/or has a desired size and/or shape. Thus, if a grating is distorted (e.g., stretched, compressed, shifted), scatterometry signatures associated with the distorted grating can be employed to identify that the grating has in fact become distorted. FIGS. 2 through 18 thus illustrate various ways in which a single grating and/or multiple gratings may be distorted.

Figure 2:
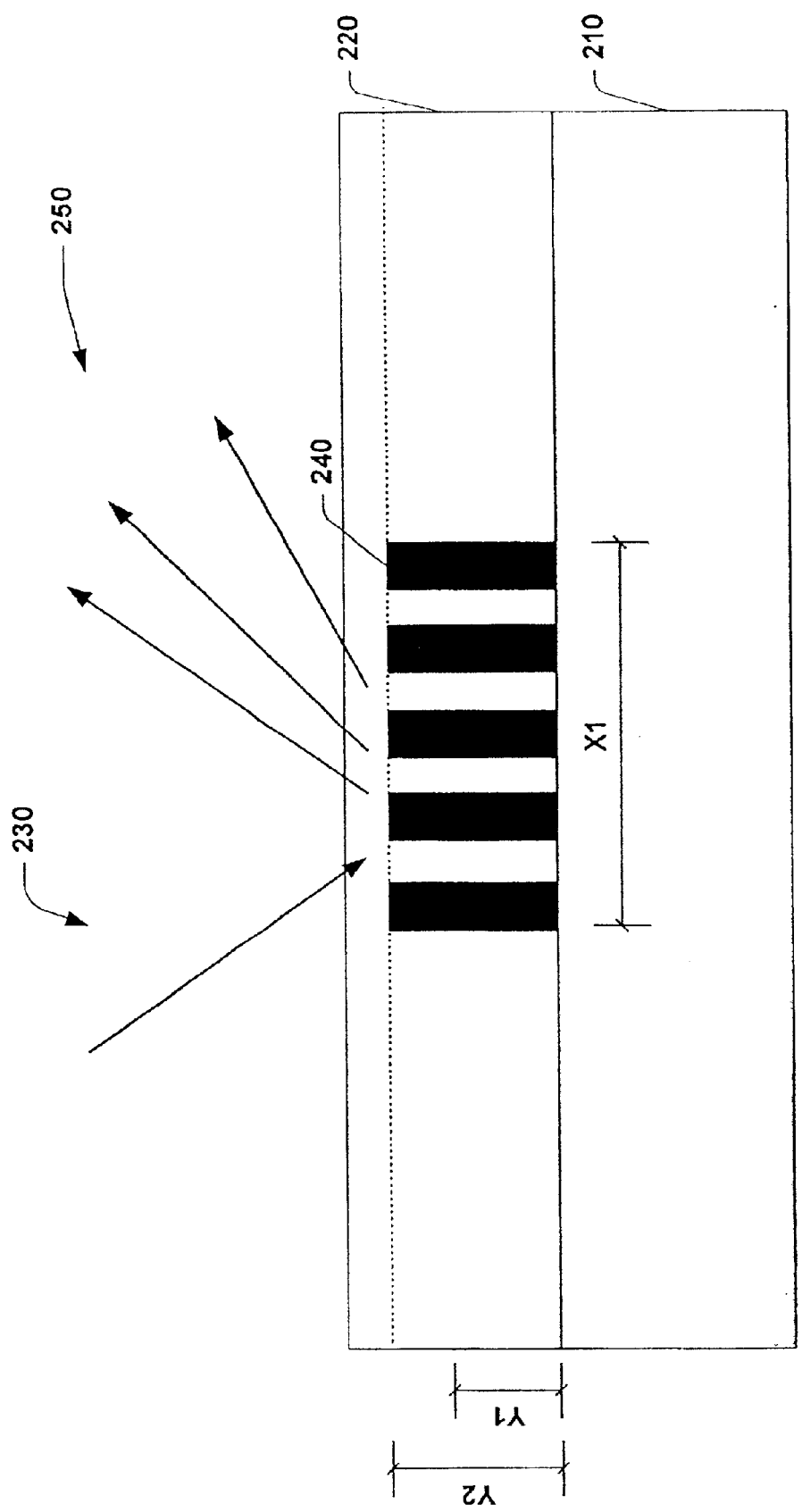
FIG. 2 illustrates a reference beam being reflected and/or refracted by a grating that has been stressed and stretched vertically on a wafer, in accordance with an aspect of the present invention.

FIG. 2 illustrates a reference beam 230 being reflected and/or refracted by a grating 240 that has been stressed and stretched vertically on a wafer. The wafer may include, for example, a substrate 210 and a thin film layer 220 where the grating 240 is fabricated. The grating 240 may have had an initial vertical dimension of Y1, but as a result of stresses in one or more fabrication processes, the vertical dimension may have been stretched to Y2. Thus, the angle, phase and/or intensity of one or more reflected and/or refracted beams 250 may vary and thus produce a unique scatterometry signature that can be employed to identify that the grating 240 has become distorted.

Figure 3:
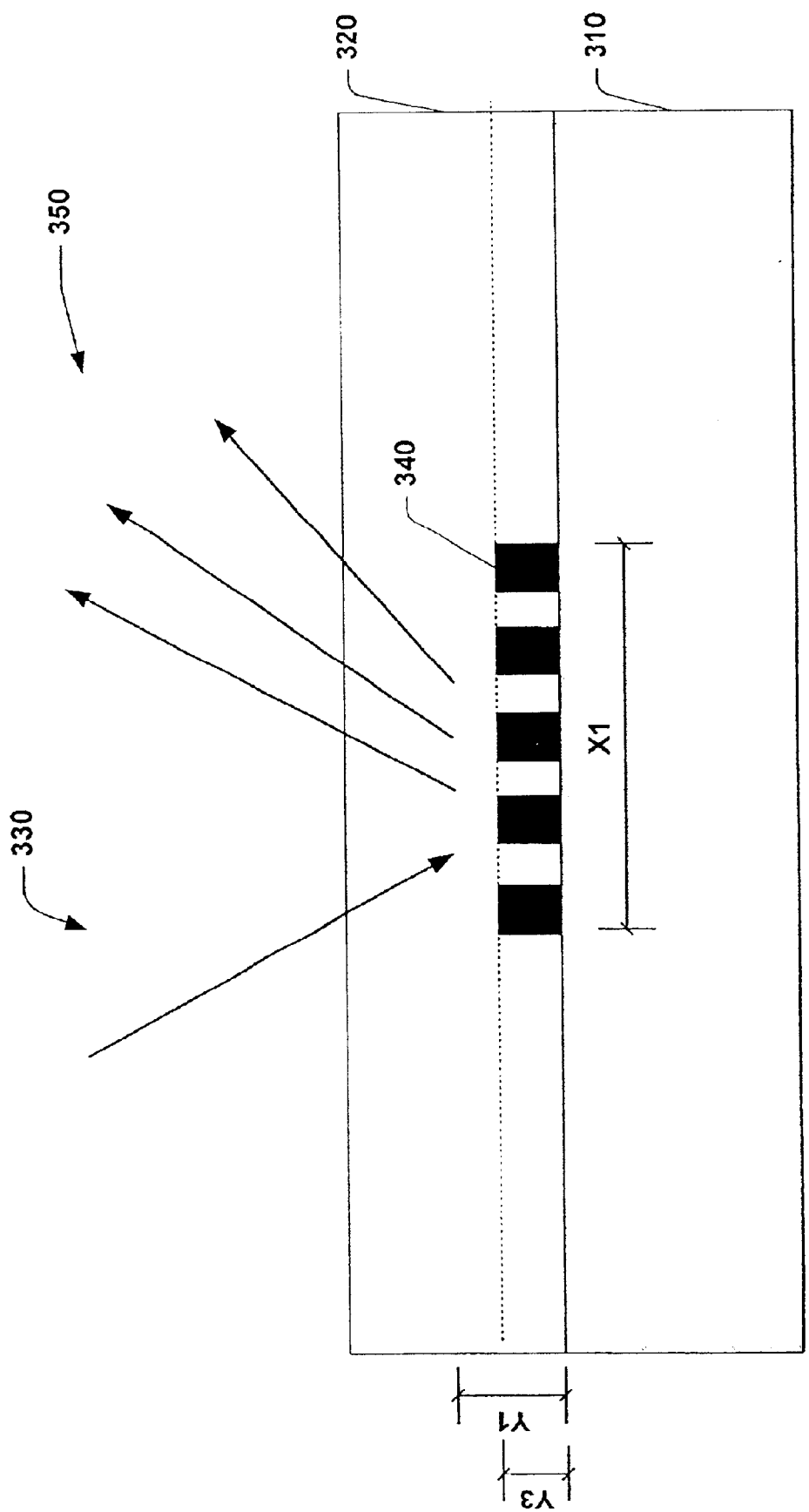
FIG. 3 illustrates a reference beam being reflected and/or refracted by a grating that has been stressed and compressed vertically on a wafer, in accordance with an aspect of the present invention.

Similarly, FIG. 3 illustrates a reference beam 330 being reflected and/or refracted by a grating 340 that has been stressed and compressed vertically on a wafer. The wafer may include, for example, a substrate 310 and a thin film layer 320 where the grating 340 is located. The grating 340 may have had an initial vertical dimension of Y1, but as a result of stresses in one or more fabrication processes, the vertical dimension may have been compressed to Y3. Thus, the angle, phase and/or intensity of one or more reflected and/or refracted beams 350 may vary and thus produce a unique scatterometry signature that can be employed to identify that the grating 340 has become distorted. The present invention facilitates gathering information concerning the grating 340 in-situ, and thus information associated with the distortion of the grating 340 can be stored for analysis. The analysis may result in adaptations that can be applied to one or more subsequent fabrication processes. Furthermore, in one example of the present invention, the information concerning the distortion of the grating 340 can be employed to generate real-time, feed-forward control data that can be employed to adapt, in-situ, the fabrication process that is generating the stresses that are leading to the distortion of the grating 340. In one example of the present invention, the feed-forward control data may be generated in association with one or more non-linear, machine learning processes (e.g., neural net, self-organizing semantic map, expert system) to facilitate optimizing fabrication processes and mitigating distortion errors.

Figure 4:
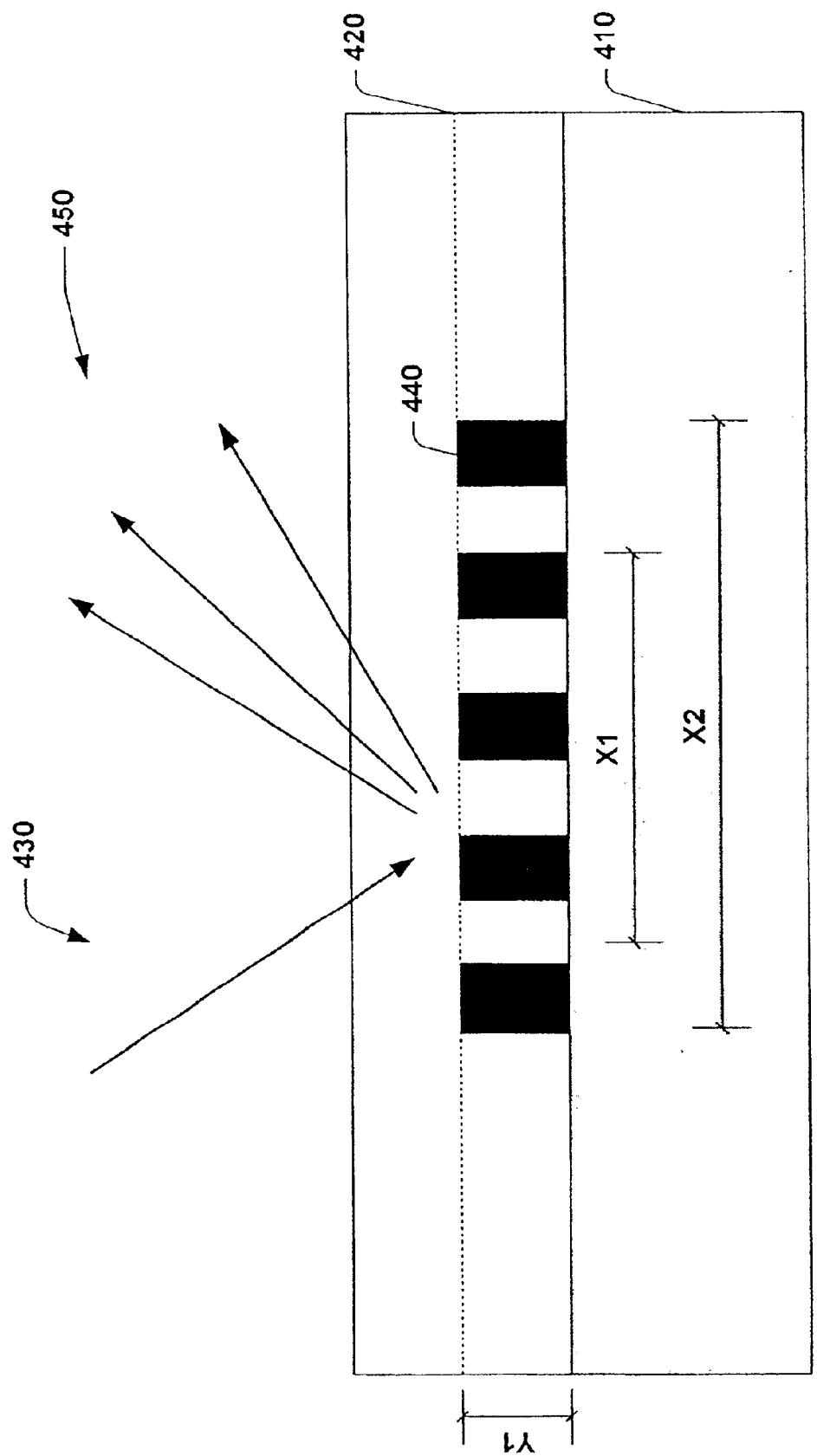
FIG. 4 illustrates a reference beam being reflected and/or refracted by a grating that has been stressed and stretched horizontally on a wafer, in accordance with an aspect of the present invention.

FIG. 4 illustrates a reference beam 430 being reflected and/or refracted by a grating 440 that has been stressed and stretched horizontally on a wafer. The grating 440 is located in a thin film layer 420 that is located on a substrate 410. The grating 440 has been stretched horizontally from its original x dimension X1 to a subsequent x dimension X2. Since the horizontal size and/or shape of the grating 440 has changed, the light 450 reflected and/or refracted by the grating 440 will also have changed (e.g., phase, intensity, angle) which will thus produce a unique scatterometry signature that may be analyzed to determine in what ways, if any, the grating 440 has been distorted.

Figure 5:
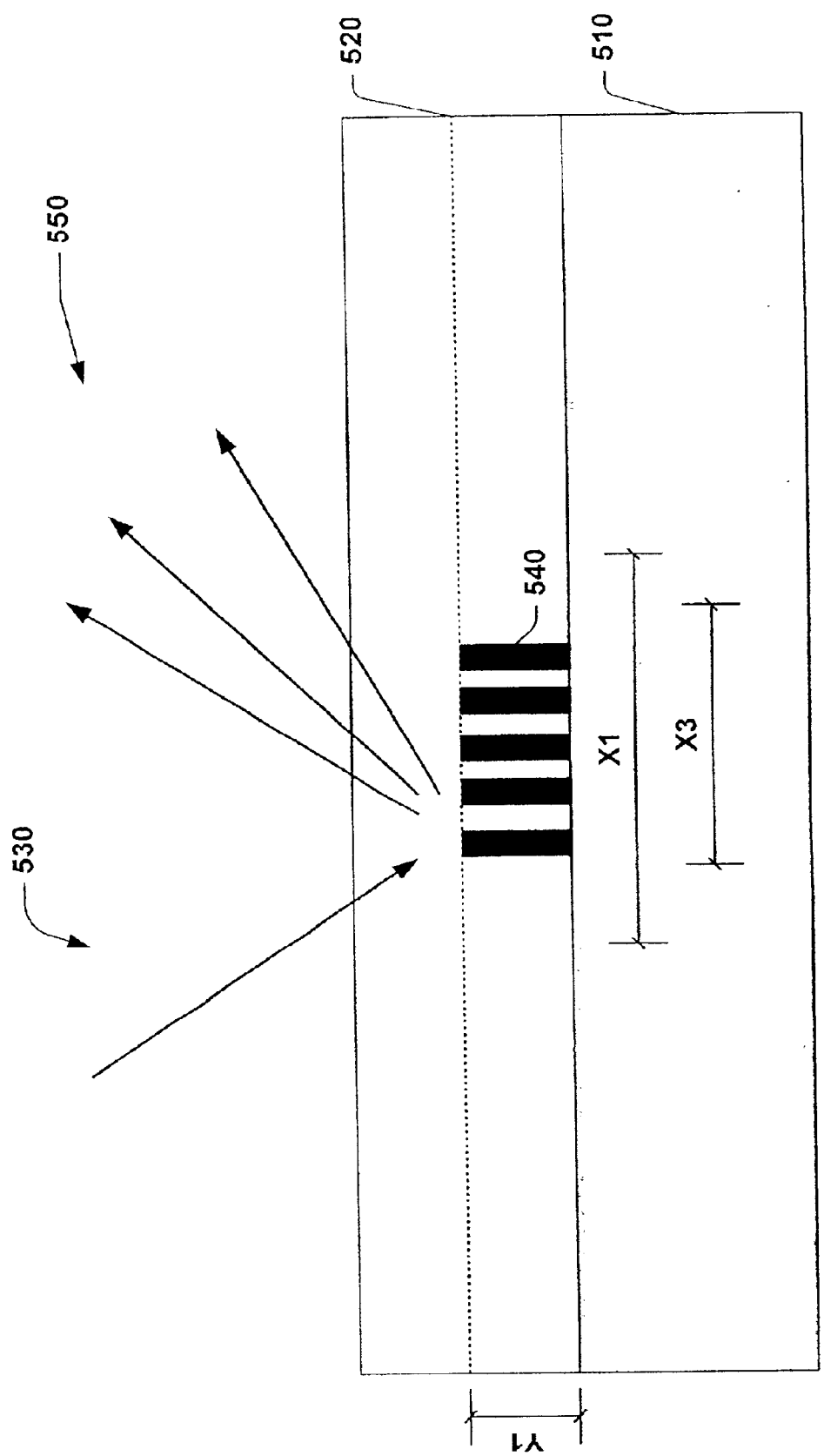
FIG. 5 illustrates a reference beam being reflected and/or refracted by a grating that has been stressed and compressed horizontally on a wafer, in accordance with an aspect of the present invention.

Similarly, FIG. 5 illustrates a reference beam 530 being reflected and/or refracted by a grating 540 that has been stressed and compressed horizontally on a wafer. The grating 540 is located in a thin film layer 520 that is located on a substrate 510. The grating 540 has been compressed horizontally from its original x dimension X1 to a subsequent x dimension X3. Since the horizontal size and/or shape of the grating 540 has changed, the light 550 reflected and/or refracted by the grating 540 will also have changed (e.g., phase, intensity, angle) which will thus produce a unique scatterometry signature that may be analyzed to determine in what ways, if any, the grating 540 has been distorted. If the distortion associated with the grating 540 is unacceptable, then the wafer upon which the grating 540 is fabricated may be marked for reworking and/or discard. Since the data concerning the grating 540 is gathered in-situ, rather than after the completion of the fabrication processes, valuable time may be saved in semiconductor fabrication. For example, in a conventional system that would only check for distortion after a fabrication process has been complete, the fabrication process must, by definition, first complete. But in the present invention, if unacceptable distortion is detected at an early point in the fabrication process, then the fabrication process can be prematurely terminated, with a resulting savings in time. Furthermore, if a progression towards an unacceptable distortion is noted at an early point in the fabrication process, then the fabrication process may be adapted to attempt to prevent the distortion from becoming unacceptable, which can lead to fewer malformed wafers.

Figure 6:
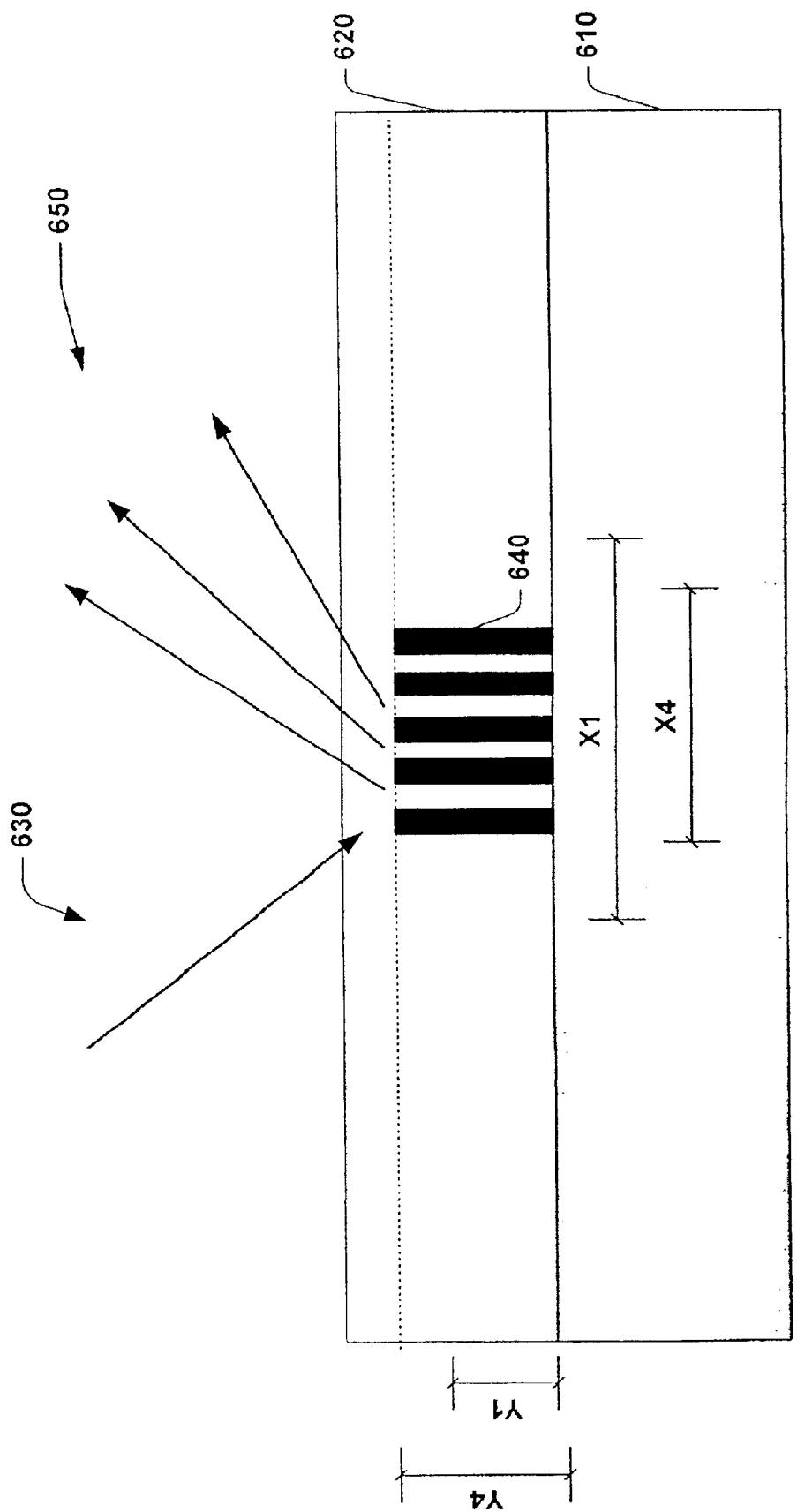
FIG. 6 illustrates a reference beam being reflected and/or refracted by a grating that has been stressed and stretched vertically and that has been stressed and compressed horizontally on a wafer, in accordance with an aspect of the present invention.

FIG. 6 illustrates a reference beam 630 being reflected and/or refracted by a grating 640 that has been stressed and stretched vertically and that has also been stressed and compressed horizontally on a wafer. The grating 640 may have changed from an initial x dimension X1 to a subsequent smaller x dimension X4 and may also have change from an initial y dimension Y1 to a subsequent greater y dimension Y4 as the result of horizontal and/or vertical stresses applied to a thin film layer 620 located on a substrate 610. Once again the angle, phase and/or intensity of one or more reflected and/or refracted beams 650 may vary as the x and y dimensions of the grating 640 change. Thus, a unique scatterometry signature may be associated with the grating 640 and such unique signature can be employed to determine whether the grating 640 has been distorted beyond acceptable limits and/or to compute real-time, feed-forward control data that can be employed to adapt a fabrication process that is producing stresses that are distorting the grating 640.

While FIGS. 1 through 6 illustrate analysis of light associated with a single grating, it is to be appreciated that a greater number of gratings may be employed in accordance with the present invention. Thus, in FIGS. 7 through 12, two gratings on a single layer in a wafer are illustrated and in FIGS. 13 through 18, two gratings on two layers in a wafer are illustrated. While FIGS. 7 through 18 illustrate two gratings, it is to be appreciated that a greater number of gratings located on a greater and/or lesser number of layers may be employed in accordance with the present invention.

Figure 7:
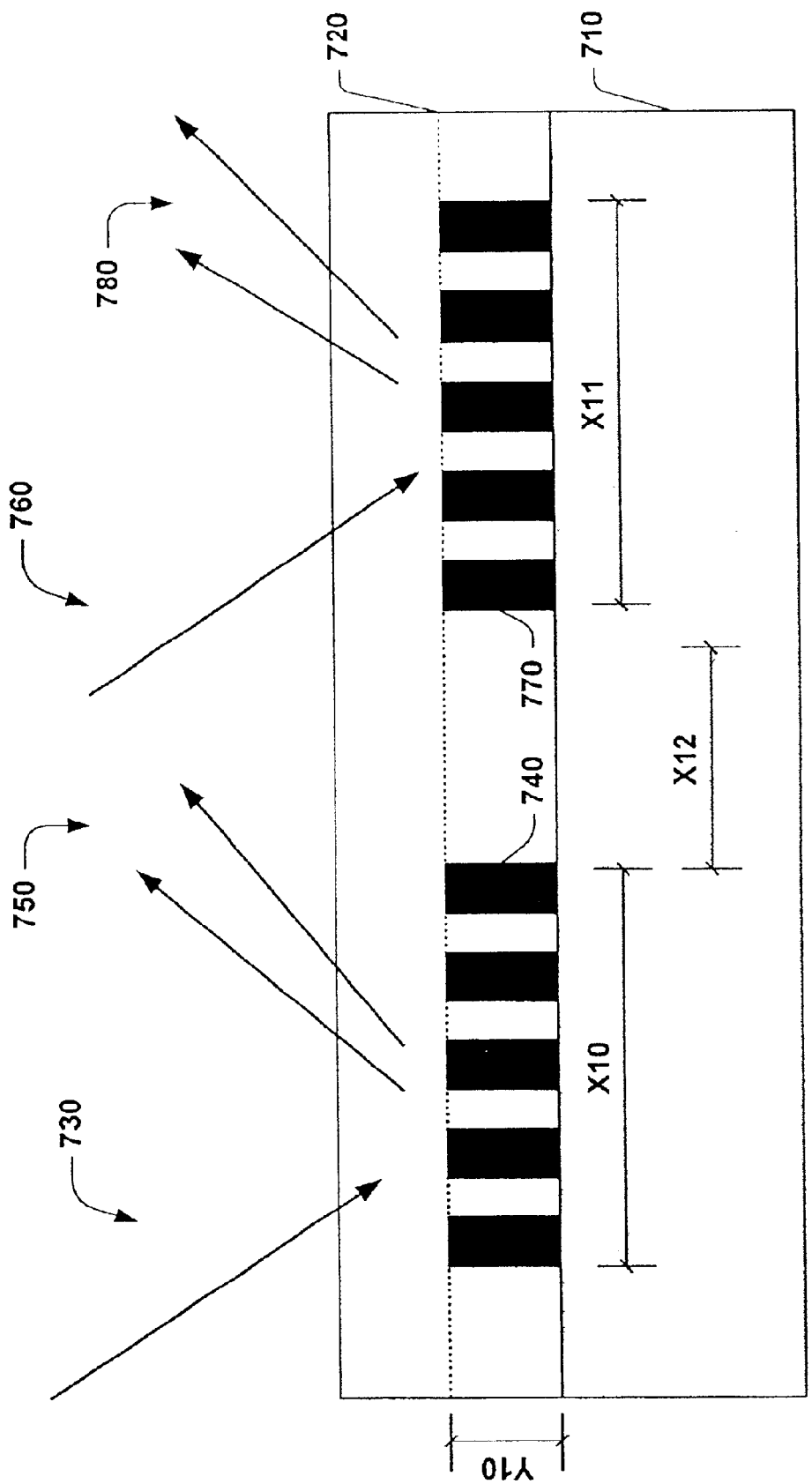
FIG. 7 illustrates a reference beam being reflected and/or refracted by two gratings on a single layer in a wafer, in accordance with an aspect of the present invention.

FIG. 7 illustrates a reference beam 730 being reflected by a grating 740 into one or more reflected beams 750 and a reference beam 760 being reflected by a grating 770 into one or more reflected beams 780. While the beam 730 and the beam 760 are illustrated as separate beams, it is to be appreciated that a single beam may be reflected by both the gratings 740 and 770. Similarly, while the beam 730 is illustrated being reflected by the grating 740, it is to be appreciated that the beam 730 may be reflected by both the gratings 740 and 770 and that the beam 760 may similarly be reflected by both the gratings 740 and 770. The gratings 740 and 770 may be located, for example, in a thin film layer 720 located on a substrate 710. Initially the grating 740 may have an x dimension X10 and a Y dimension Y10 while the grating 770 may have an x dimension X11 and a Y dimension Y10. Furthermore, since there are two gratings, the gratings may initially be separated by a horizontal dimension X12. As stresses are applied to the thin film layer 720 and/or the substrate 710, the gratings 740 and 770 may be distorted in ways including, but not limited to, horizontal stretch, vertical stretch, horizontal compression, vertical compression, horizontal shift and vertical shift. FIGS. 8 through 12 illustrate various distortions of the gratings 740 and 770, each of which may be analyzed by the present invention via scatterometry signatures. Analyzing the distortion, and the rate of change of distortion can be employed to adapt, ex-situ and/or in-situ, the fabrication processes being applied to the wafer.

Figure 8:
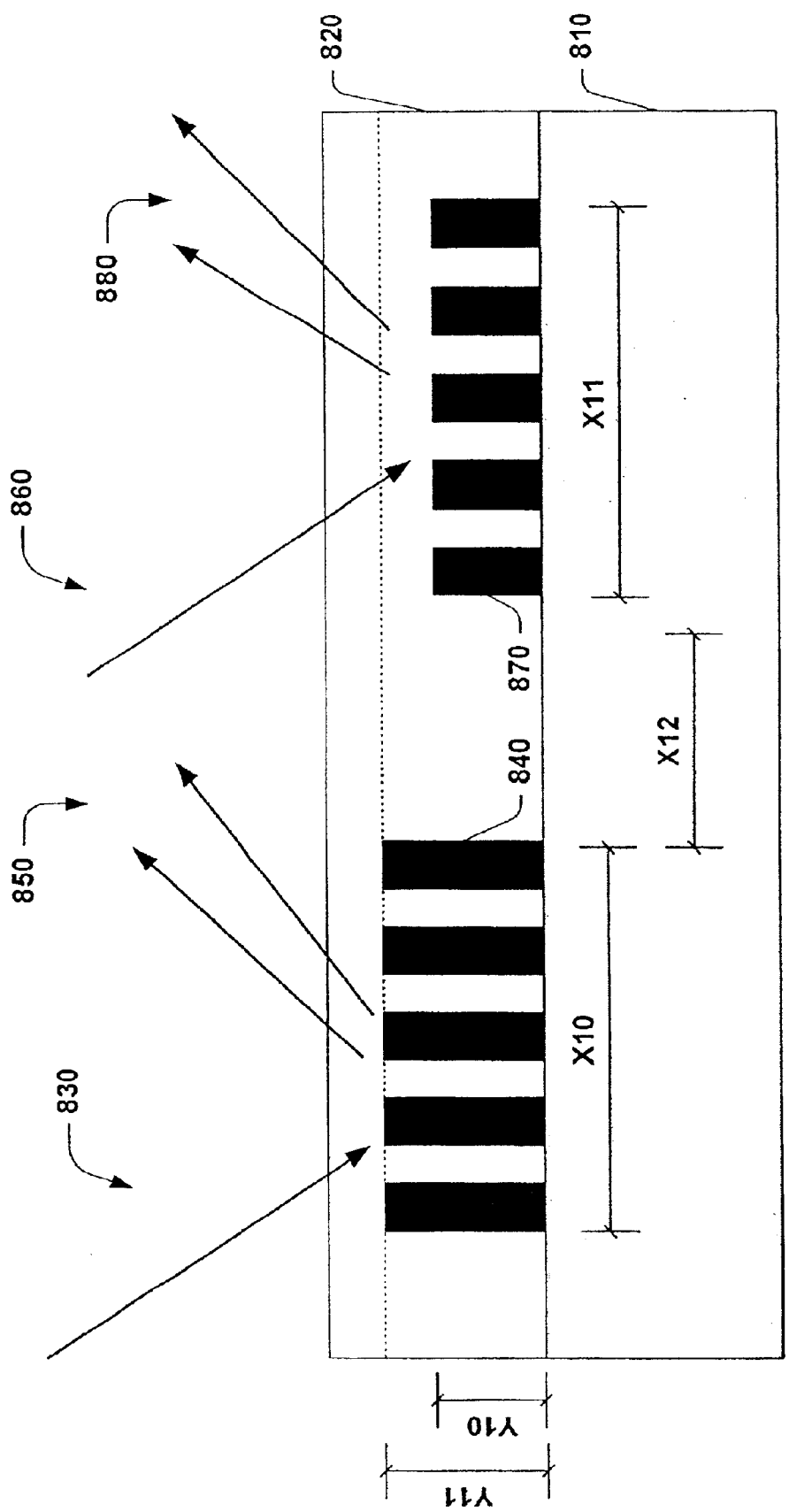
FIG. 8 illustrates a reference beam being reflected and/or refracted by two gratings on a single layer in a wafer where one grating has been stressed and stretched vertically, in accordance with an aspect of the present invention.

FIG. 8 illustrates a reference beam 830 being reflected by a grating 840 into one or more reflected beams 850 and a reference beam 860 being reflected by a grating 870 into one or more reflected beams 880. The grating 840 has been distorted in the vertical direction from an original y dimension Y10 to a subsequent, larger y dimension Y11. Such distortion may cause the beams 850 to create a different, unique scatterometry signature that can be employed to analyze the distortion and/or rate of change of distortion.

Figure 9:
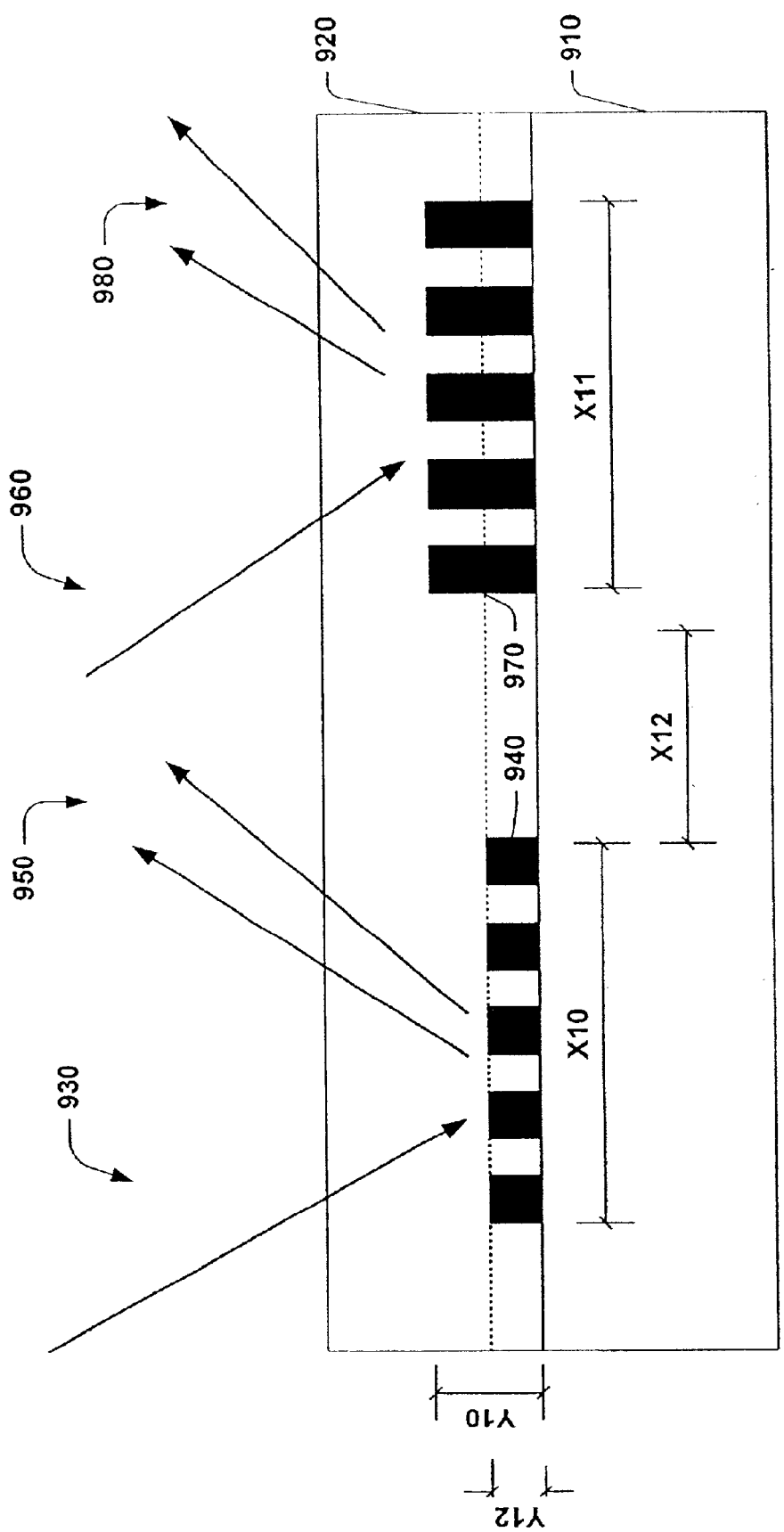
FIG. 9 illustrates a reference beam being reflected and/or refracted by two gratings on a single layer in a wafer where one grating has been stressed and compressed vertically, in accordance with an aspect of the present invention.

Similarly, FIG. 9 illustrates a reference beam 930 being reflected by a grating 940 into one or more reflected beams 950 and a reference beam 960 being reflected by a grating 970 into one or more reflected beams 980. The grating 940 has been distorted in the vertical direction from an original y dimension Y10 to a subsequent, smaller y dimension Y12. Such distortion may cause the beams 950 to create a different, unique scatterometry signature that can be employed to analyze the distortion and/or rate of change of distortion.

Figure 10:
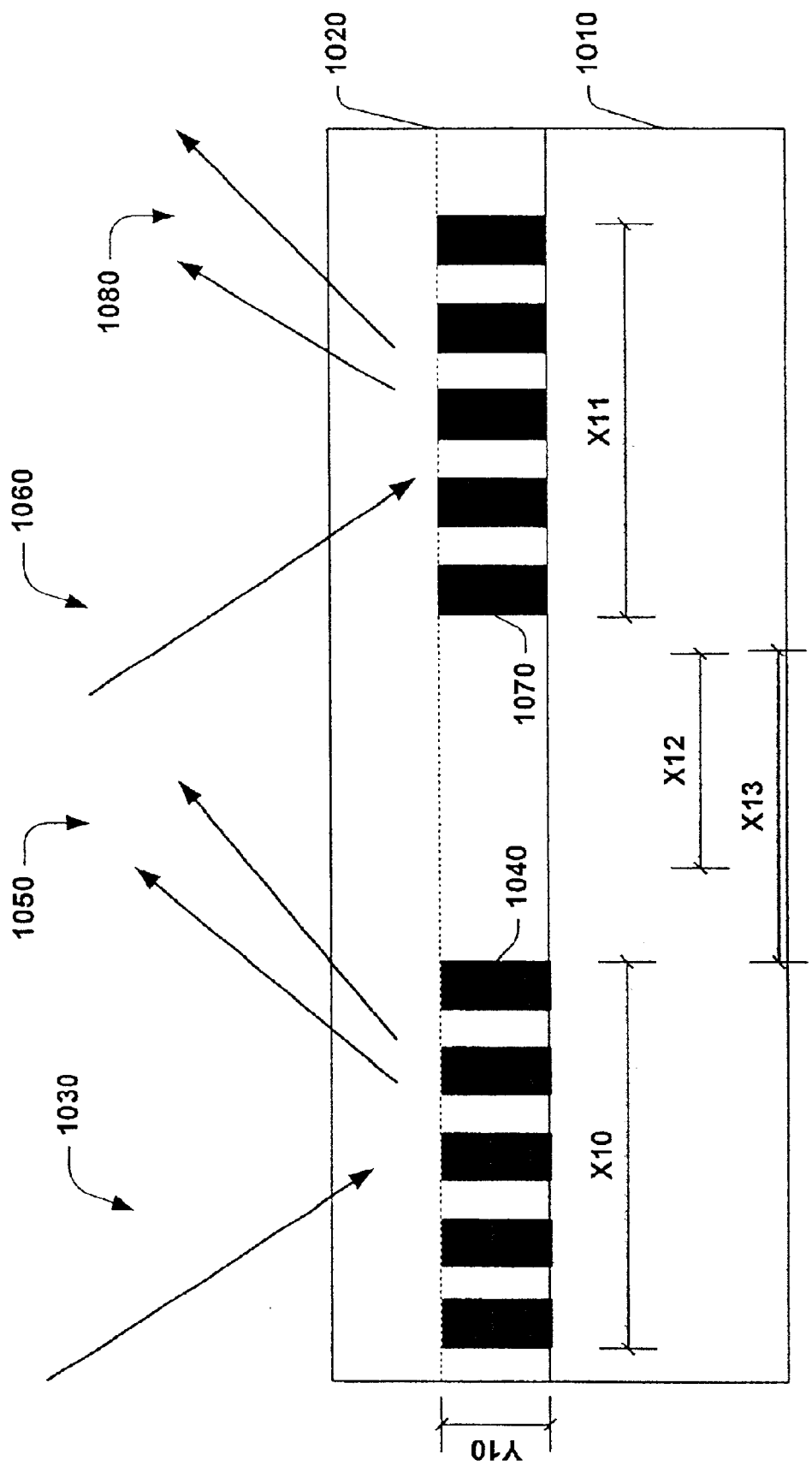
FIG. 10 illustrates a reference beam being reflected and/or refracted by two gratings on a single layer in a wafer where one grating has been shifted horizontally away from another grating, in accordance with an aspect of the present invention.

While FIGS. 8 and 9 illustrate vertical distortion, FIG. 10 illustrates a reference beam 1030 being reflected by a grating 1040 into one or more reflected beams 1050 and a reference beam 1060 being reflected by a grating 1070 into one or more reflected beams 1080 where the grating 1040 has been shifted horizontally away from the grating 1070. Thus, the original distance X12 between the gratings 1040 and 1070 has been increased to a subsequent distance X13. Such horizontal shifting may cause the beams 1050 and/or 1080 to create a different, unique scatterometry signature that can be employed to analyze the distortion/shifting and/or rate of change of distortion/shifting. If the distortion/shifting is unacceptable then the fabrication process may be terminated early, saving time over conventional processes that would not measure the distortion until the fabrication process was substantially complete. Furthermore, if the rate of change of distortion/shifting indicates that an unacceptable distortion/shifting is likely to occur, then real-time, feed-forward control data can be generated to adapt the fabrication process in an attempt to change the rate of change and prevent unacceptable distortion.

Figure 11:
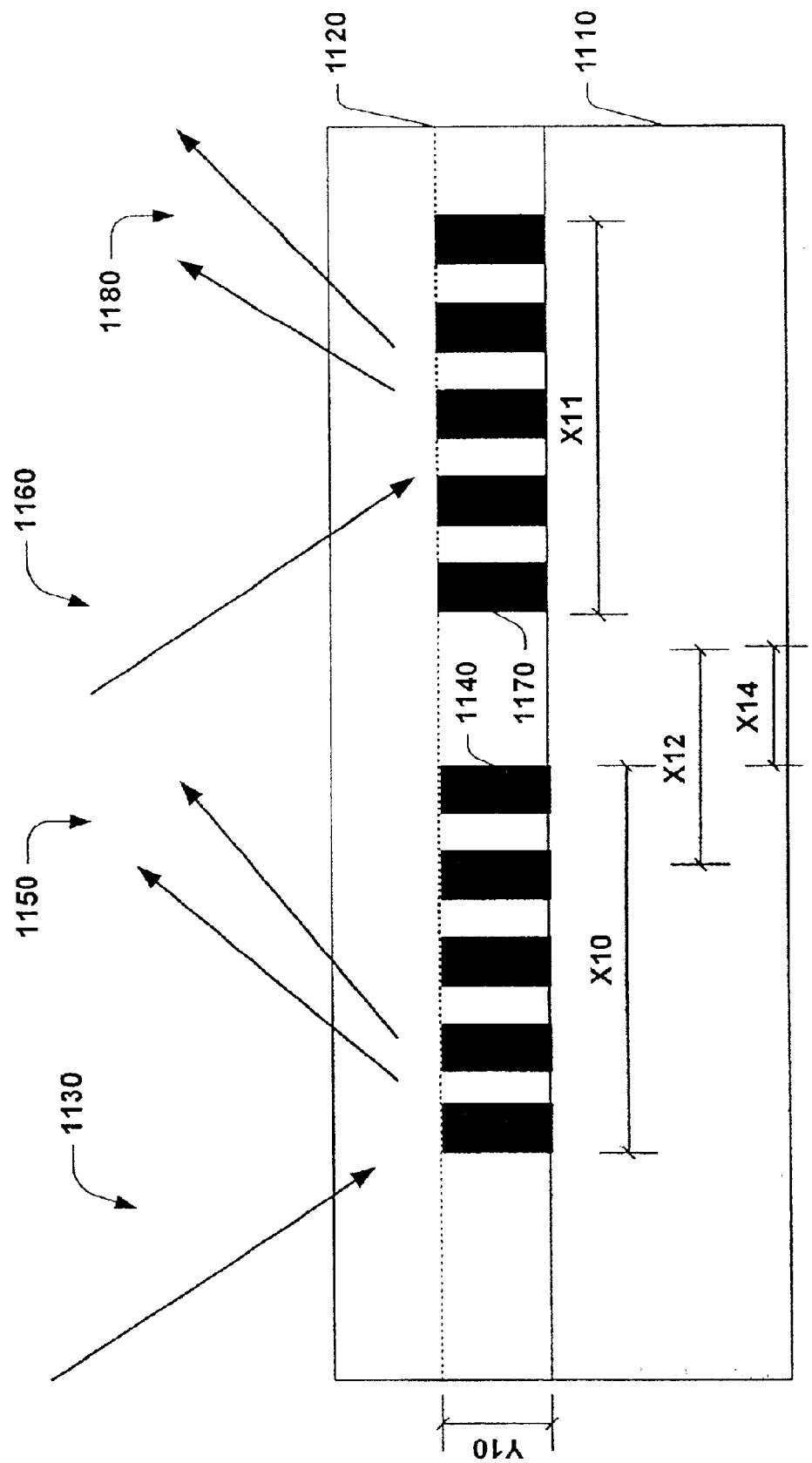
FIG. 11 illustrates a reference beam being reflected and/or refracted by two gratings on a single layer in a wafer where one grating has been shifted horizontally towards another grating, in accordance with an aspect of the present invention.

Similarly, FIG. 11 illustrates a reference beam 1130 being reflected by a grating 1140 into one or more reflected beams 1150 and a reference beam 1160 being reflected by a grating 1170 into one or more reflected beams 1180 where the grating 1140 has been shifted horizontally towards the grating 1170. Thus, the original distance X12 between the gratings 1140 and 1170 has been decreased to a subsequent shorter distance X14. Such horizontal shifting may cause the beams 1150 and/or 1180 to create a different, unique scatterometry signature that can be employed to analyze the distortion/shifting and/or rate of change of distortion/shifting.

Figure 12:
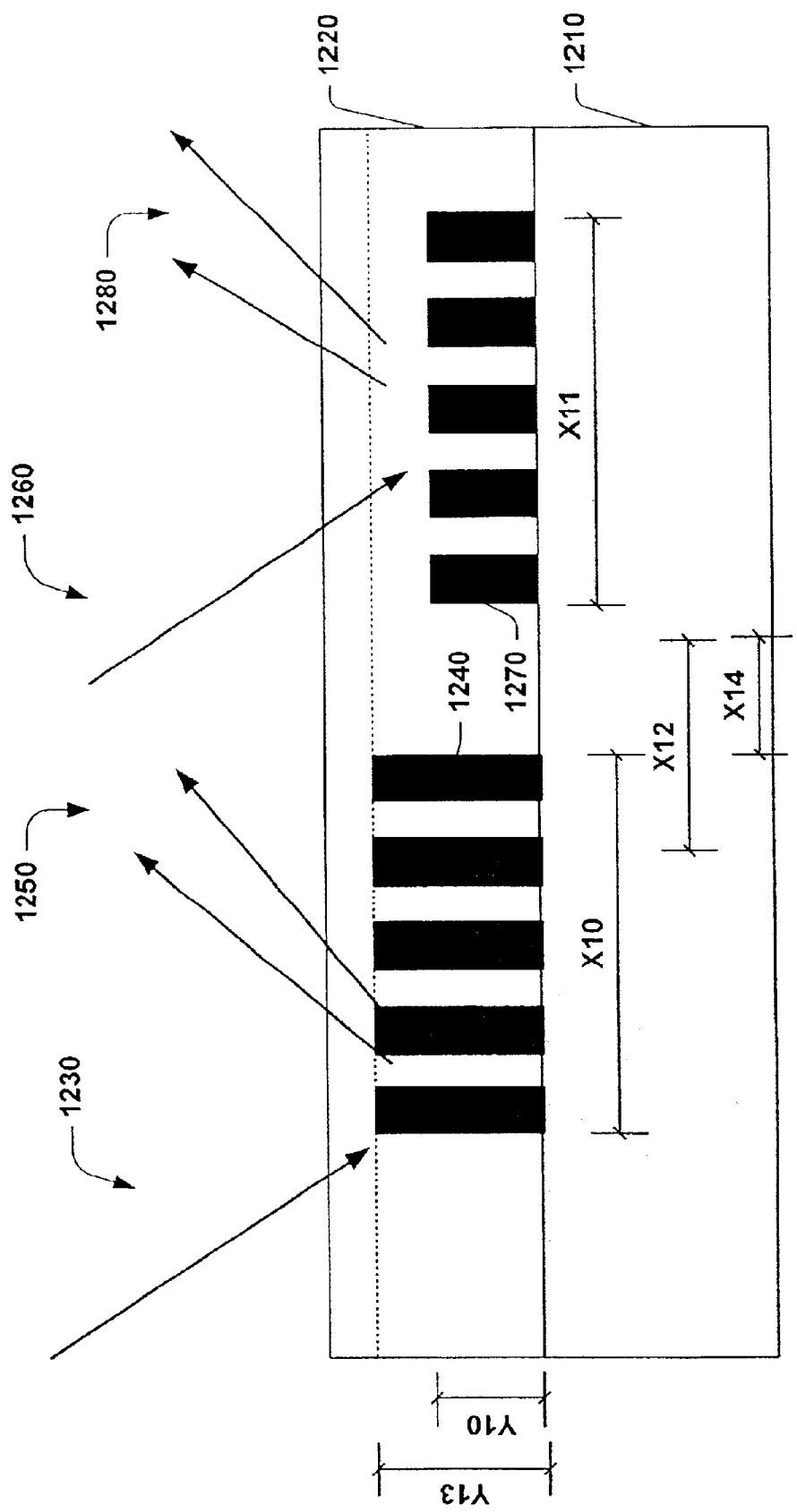
FIG. 12 illustrates a reference beam being reflected and/or refracted by two gratings on a single layer in a wafer where one grating has been stressed and stretched vertically and has been stressed and stretched and shifted horizontally, in accordance with an aspect of the present invention.

While FIGS. 8 and 9 illustrate reference beams being affected by vertical distortion and FIGS. 10 and 11 illustrate reference beams being affected by horizontal shifts, FIG. 12 illustrates a reference beam 1230 and a reference beam 1260 being affected by both vertical and horizontal distortion. A grating 1240 has been stressed and stretched vertically from its original y dimension of Y10 to a subsequent y dimension of Y13. Furthermore, the grating 1240 has been shifted horizontally towards the grating 1270, reducing the original distance X12 between the gratings to a shorter distance X14. Thus, the reflected beams 1250 and/or 1280 may produce a unique scatterometry signature that can be analyzed to determine whether unacceptable distortion and/or correctable rate of change distortion has occurred. While the gratings in FIGS. 1 through 18 include five grating lines, it is to be appreciated that a greater and/or lesser number of grating lines may be employed in gratings employed in the present invention.

Figure 13:
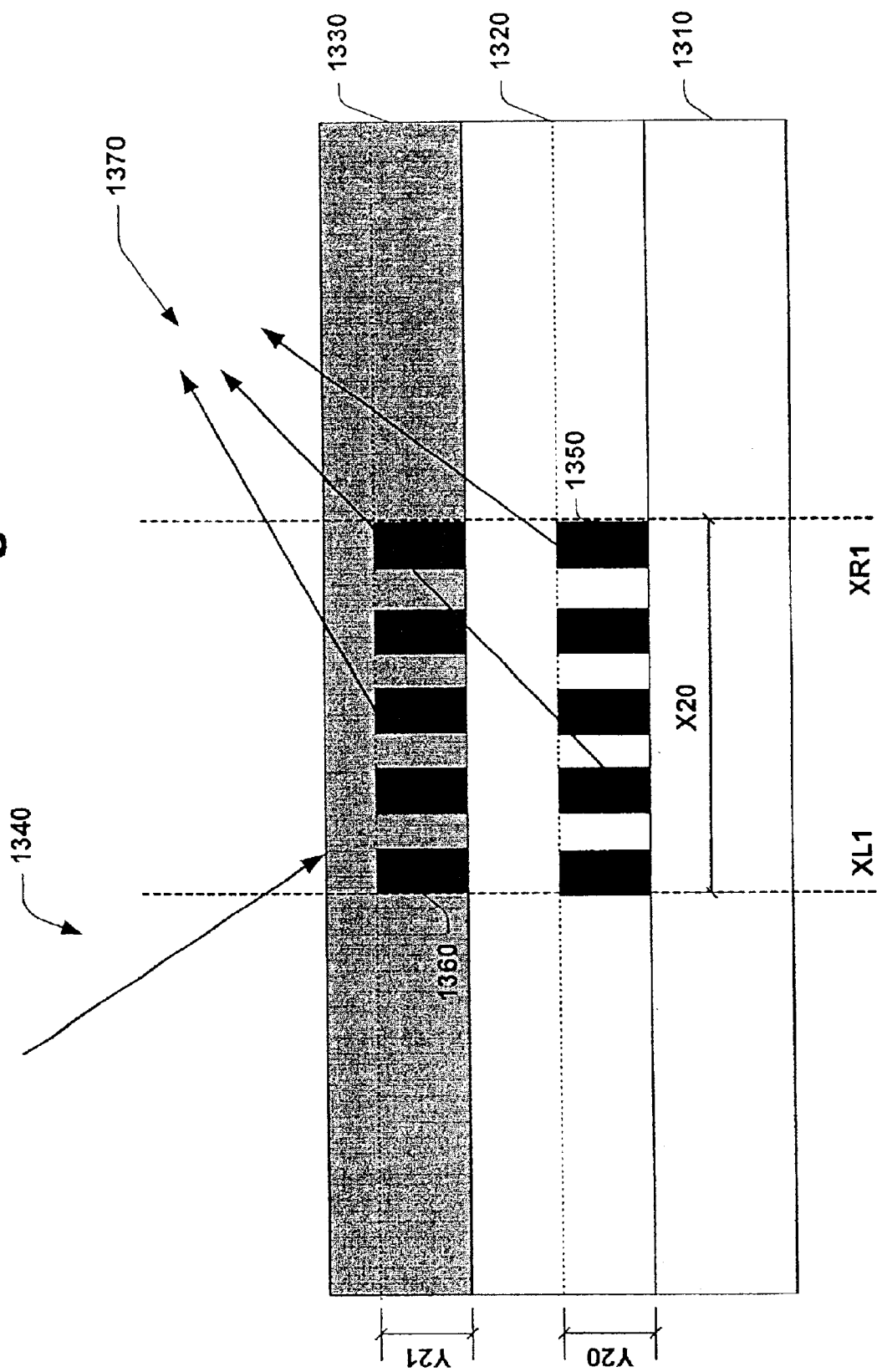
FIG. 13 illustrates a reference beam being reflected and/or refracted by two gratings on two layers in a wafer, in accordance with an aspect of the present invention.

While FIGS. 7 through 12 illustrate two gratings on one layer in a wafer, FIGS. 13 through 18 illustrate two gratings on a wafer, with each wafer located in a different layer on the wafer. Thus, FIG. 13 illustrates a reference beam 1340 being reflected and/or refracted by a first grating 1360 located in a first layer 1330 and also being reflected and/or refracted by a second grating 1350 located in a second layer 1320. The two layers are located on a substrate 1310. In FIG. 13, the grating 1360 is positioned substantially directly above the grating 1350, and thus the left side of the gratings 1360 and 1350 can be marked by location XL1 and the right side of the gratings 1360 and 1350 can be marked by location XR1. The gratings 1360 and 1350 initially share a common x dimension X20, while the grating 1360 has an initial y dimension Y21 and the grating 1350 has an initial y dimension Y20. The light 1370 reflected and/or refracted from the gratings 1360 and 1370 may create a unique scatterometry signature that can be compared to stored scatterometry signatures to facilitate analyzing distortion in the gratings 1360 and 1350.

Figure 14:
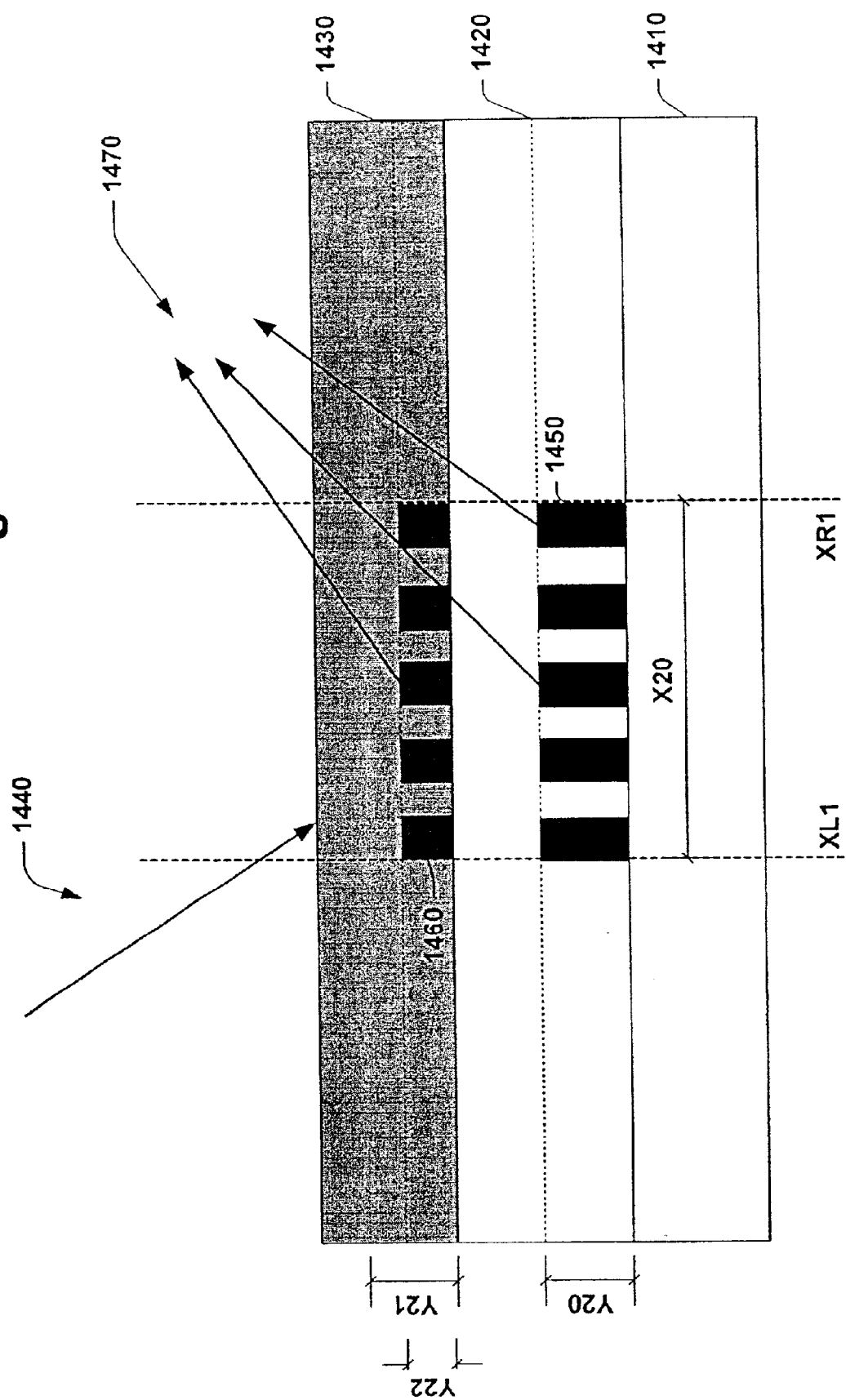
FIG. 14 illustrates a reference beam being reflected and/or refracted by two gratings on two layers in a wafer where one grating has been stressed and compressed vertically, in accordance with an aspect of the present invention.

FIG. 14 illustrates a reference beam 1440 being reflected and/or refracted by a first grating 1460 located in a first layer 1430 and also being reflected and/or refracted by a second grating 1450 located in a second layer 1420. The two layers are located on a substrate 1410. In FIG. 14, the grating 1460 is still positioned substantially directly above the grating 1450, and thus the left side of the gratings 1460 and 1450 can still be marked by location XL1 and the right side of the gratings 1460 and 1450 can still be marked by location XR1 and thus the gratings 1460 and 1450 still share a common x dimension X20. However, the grating 1460 has been stressed and compressed horizontally, and thus the initial y dimension Y21 has been compressed to a shorter y dimension Y22. The light 1470 reflected and/or refracted from the gratings 1460 and 1470 may create a unique scatterometry signature that can be compared to stored scatterometry signatures to facilitate analyzing distortion in the gratings 1460 and 1450.

Figure 15:
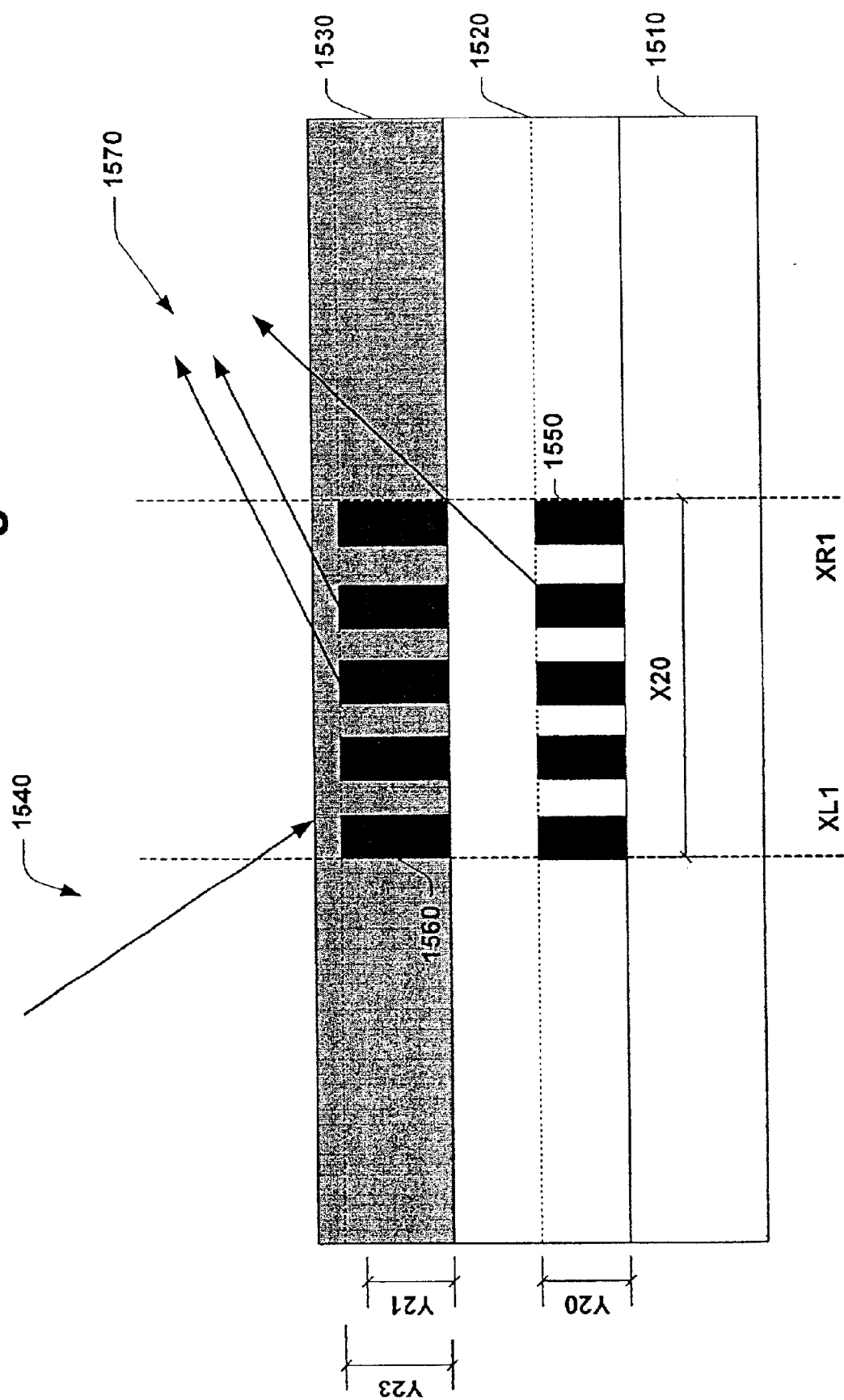
FIG. 15 illustrates a reference beam being reflected and/or refracted by two gratings on two layers in a wafer where one grating has been stressed and stretched vertically, in accordance with an aspect of the present invention.

While FIG. 14 illustrates vertical compression, FIG. 15 illustrates vertical stretching. Thus, FIG. 15 illustrates a reference beam 1540 being reflected and/or refracted by a first grating 1560 located in a first layer 1530 and also being reflected and/or refracted by a second grating 1550 located in a second layer 1520. The two layers are located on a substrate 1510. In FIG. 15, the grating 1560 is still positioned substantially directly above the grating 1550, and thus the left side of the gratings 1560 and 1550 can still be marked by location XL1 and the right side of the gratings 1560 and 1550 can still be marked by location XR1 and thus the gratings 1560 and 1550 still share a common x dimension X20. However, the grating 1560 has been stressed and stretched horizontally, and thus the initial y dimension Y21 has been stretched to a larger y dimension Y23. The light 1570 reflected and/or refracted from the gratings 1560 and 1570 may create a unique scatterometry signature that can be compared to stored scatterometry signatures to facilitate analyzing distortion in the gratings 1560 and 1550.

Figure 16:
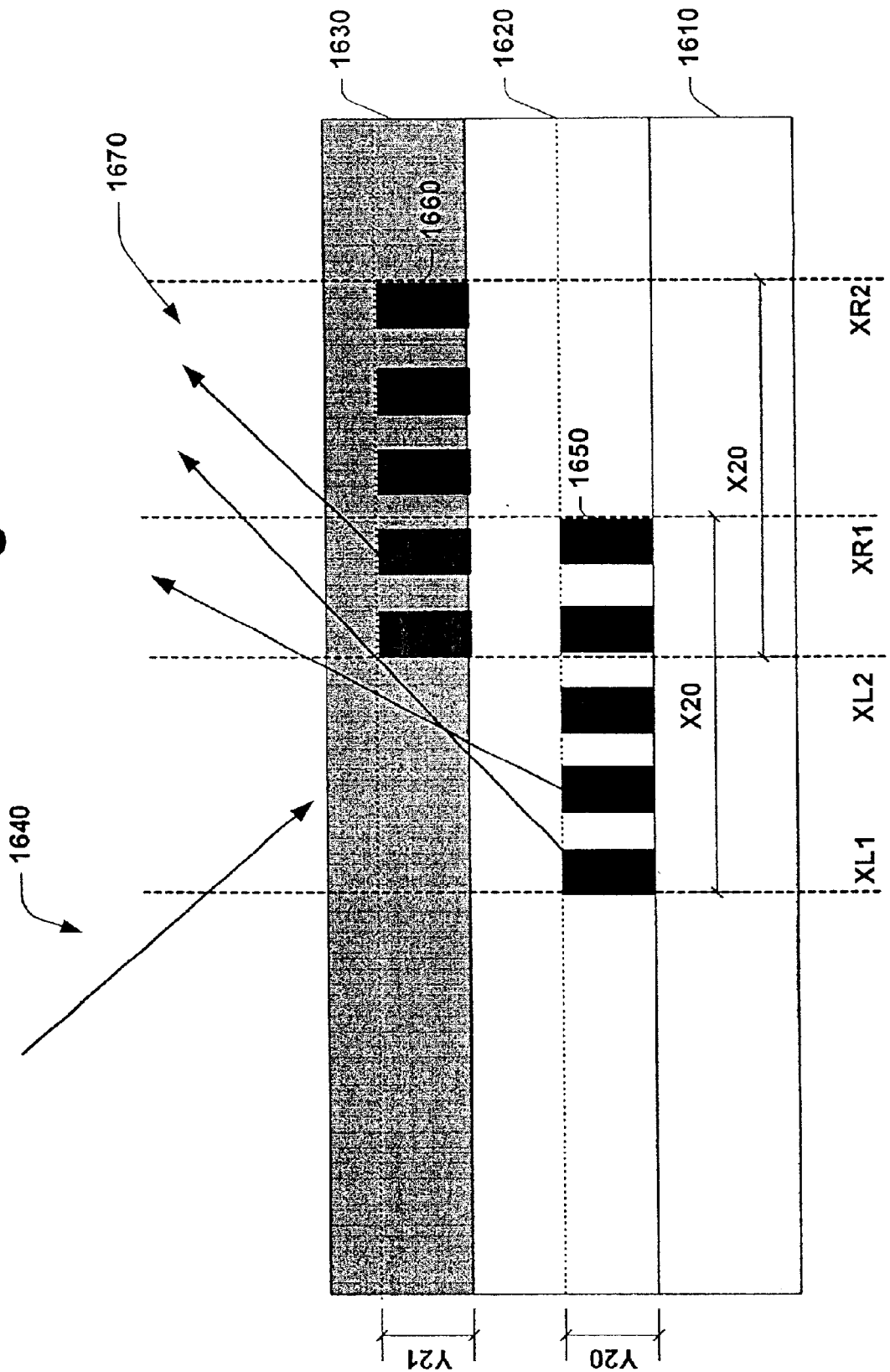
FIG. 16 illustrates a reference beam being reflected and/or refracted by two gratings on two layers in a wafer where one grating has been shifted horizontally away from another grating, in accordance with an aspect of the present invention.

While FIGS. 14 and 15 illustrate vertical distortion, FIG. 16 illustrates horizontal distortion/shifting that may be monitored and analyzed to produce real-time, feed-forward control data that can be employed to adapt one or more fabrication processes. Thus, FIG. 16 illustrates a reference beam 1640 being reflected and/or refracted by a first grating 1660 located in a first layer 1630 and also being reflected and/or refracted by a second grating 1650 located in a second layer 1620. The two layers are located on a substrate 1610. In FIG. 16, the grating 1660 is no longer positioned substantially directly above the grating 1650, and thus while the left side of the grating 1650 may still be marked by location XL1 and the right side of the grating 1650 may still be marked by location XR1, the left side of the grating 1660 has been shifted right and thus a new left marker XL2 marks the left side of the grating 1660 and a new right marker XR2 marks the right side of the grating 1660. The light 1670 reflected and/or refracted from the gratings 1660 and 1670 may create a unique scatterometry signature that can be compared to stored scatterometry signatures to facilitate analyzing distortion in the gratings 1660 and 1650. By way of illustration, a scatterometry signature associated with the light reflected from the gratings 1360 (FIG. 13) and 1350 (FIG. 13) may be compared to a scatterometry signature associated with the light reflected from the gratings 1660 and 1650 to determine whether distortion has occurred, and if so, whether the amount of distortion is acceptable, correctable or unacceptable, for example. Data associated with the distortion identified by such scatterometry signatures may be analyzed by entities including, but not limited to, human analyzers, computers and computer programs. In one example of the present invention, such analysis may be performed by a computer programmed with a nonlinear, machine-learning algorithm that will, over time, adapt one or more fabrication processes in an attempt to mitigate distortion problems associated with stress on layers on wafers.

Figure 17:
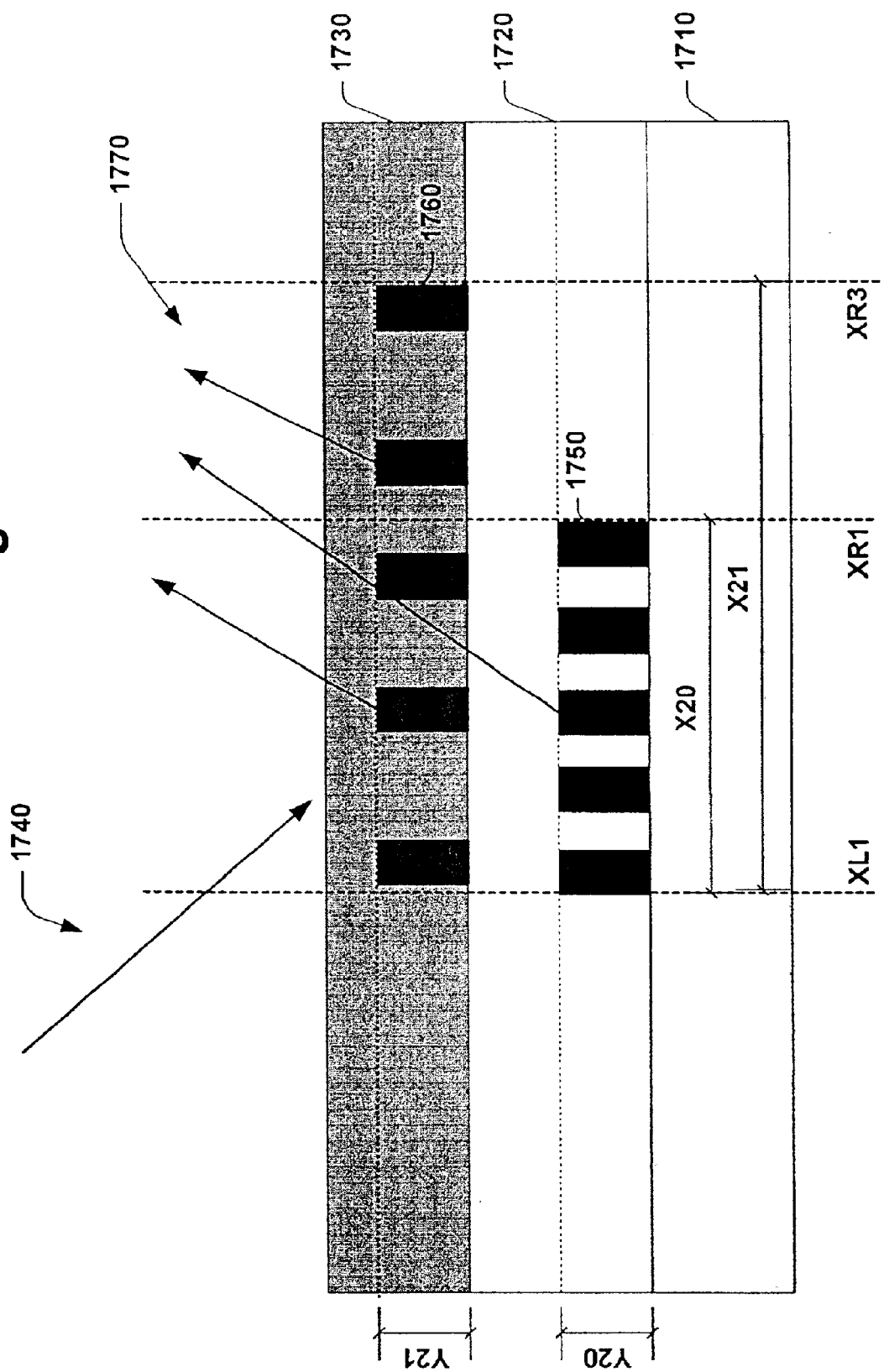
FIG. 17 illustrates a reference beam being reflected and/or refracted by two gratings on two layers in a wafer where one grating has been stressed and stretched horizontally, in accordance with an aspect of the present invention.

FIG. 17 illustrates horizontal distortion/stretching that may be monitored and analyzed to produce real-time, feed-forward control data that can be employed to adapt one or more fabrication processes. Thus, FIG. 17 illustrates a reference beam 1740 being reflected and/or refracted by a first grating 1760 located in a first layer 1730 where the first grating 1760 has been stressed and stretched horizontally. FIG. 17 also illustrates the light 1740 being reflected and/or refracted by a second grating 1750 located in a second layer 1720, where the second grating 1750 has remained substantially stable. Thus, the differences between the two gratings 1760 and 1750 can be analyzed to identify varying stresses being asserted against different layers on a wafer. Such varying stresses may be associated with problems in various fabrication processes (e.g., deposition, development, etching, polishing, annealing, etc.) and thus analyzing the various stresses and their resulting distortions may facilitate mitigating problems associated with such fabrication processes. In FIG. 17, the grating 1760 is no longer positioned substantially directly above the grating 1750, and thus while the left side of the gratings 1750 and 1760 may still be marked by location XL1 and the right side of the grating 1760 may still be marked by location XR1, the right side of the grating 1760 has been stretched to the right and a new right marker XR3 marks the right side of the grating 1760.

The light 1770 reflected and/or refracted from the gratings 1760 and 1770 may create a unique scatterometry signature that can be compared to stored scatterometry signatures to facilitate analyzing distortion in the gratings 1760 and 1750. By way of illustration, a scatterometry signature associated with the light reflected from the gratings 1360 (FIG. 13) and 1350 (FIG. 13) may be compared to a scatterometry signature associated with the light reflected from-the gratings 1760 and 1750 to determine whether distortion has occurred, and if so, whether the amount of distortion is acceptable, correctable or unacceptable, for example. If the distortion is caused by a known fabrication parameter (e.g., temperature), then the fabrication parameter may be adjusted in an attempt to prevent the distortion from becoming unacceptable. Such adjustable fabrication parameters may include but are not limited to time, temperature, pressure, atmosphere, spin rpm, deposition rate, formulae, concentrations and amount and type of light in a reaction chamber, for example. Thus, fabrication components (e.g. spin track, stepper motor, rapid thermal annealer, chemical vapor depositor, developer, dry etcher, wet etcher, etc.) may be controlled by real-time, feed-forward control data generated by the present invention based on analyses of scatterometry signatures associated with gratings on a wafer.

Figure 18:
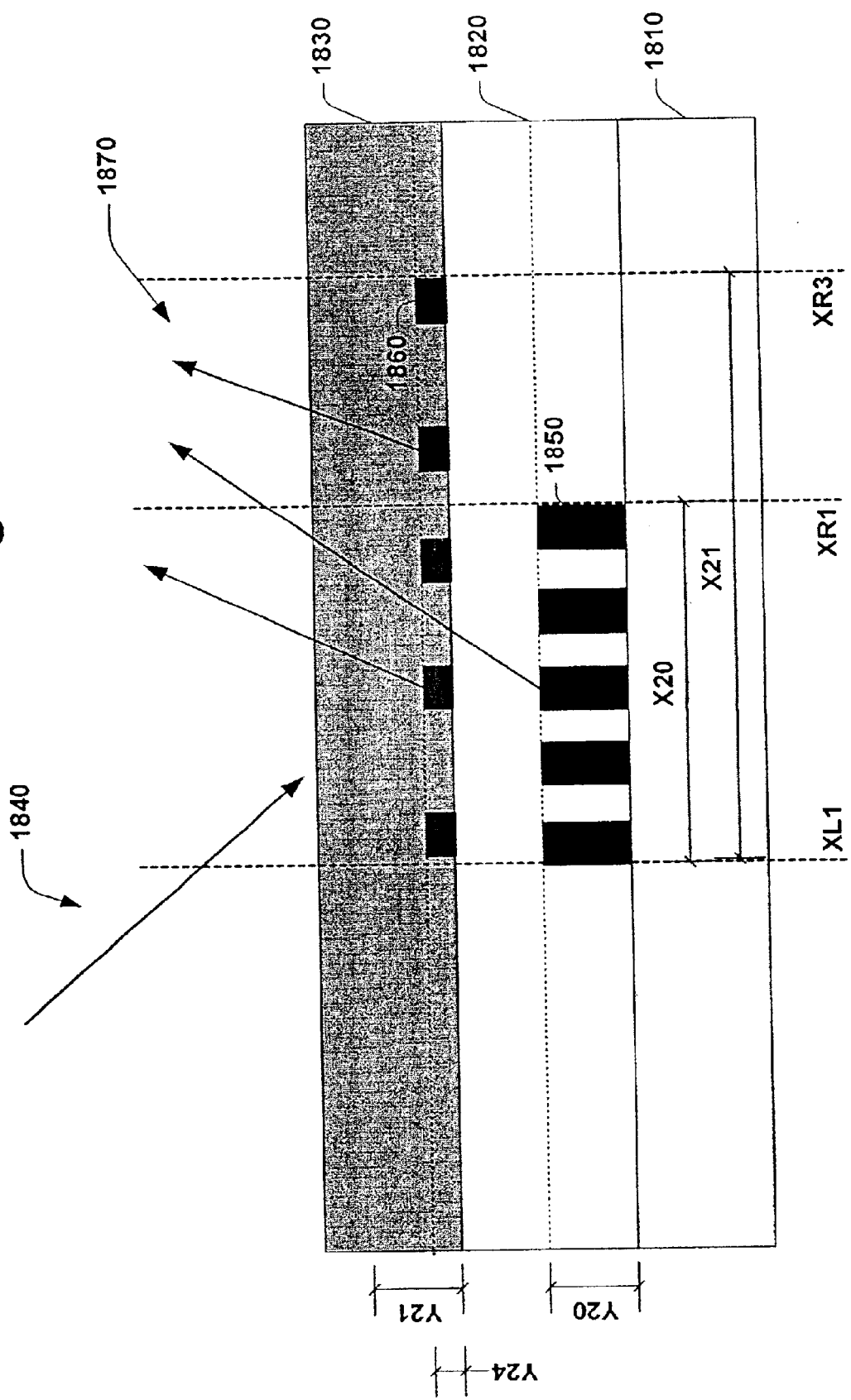
FIG. 18 illustrates a reference beam being reflected and/or refracted by two gratings on two layers in a wafer where one grating has been stressed and compressed vertically and has been stressed and stretched horizontally, in accordance with an aspect of the present invention.

FIG. 18 illustrates both vertical compression and horizontal stretching in a wafer. Thus, the beam 1840, which reflects and/or refracts from the gratings 1860 and/or 1850 into one or more beams 1870 will have a distinct scatterometry signature based on the gratings 1860 and/or 1850 as affected by distortion creating stresses. The grating 1860 has been compressed from an original y dimension Y21 to a shorter y dimension Y24 while also being stretched from an original x dimension X20 to a subsequent larger x dimension X21. Such vertical and/or horizontal distortion may be indicative of one or more problems associated with a fabrication process. Thus, the present invention facilitates storing distortion measurements so that analyses can be performed, both in real-time and later, in a non-real-time manner. Such analyses may be employed to study the stresses produced during fabrication processes and in one example of the present invention, to produce real-time, feed-forward control data that can be employed to control fabrication components. Thus, fewer wafers may be wasted during fabrication and more precise CDs may be achieved on wafers, increasing the quality of integrated circuits.

Figure 19:
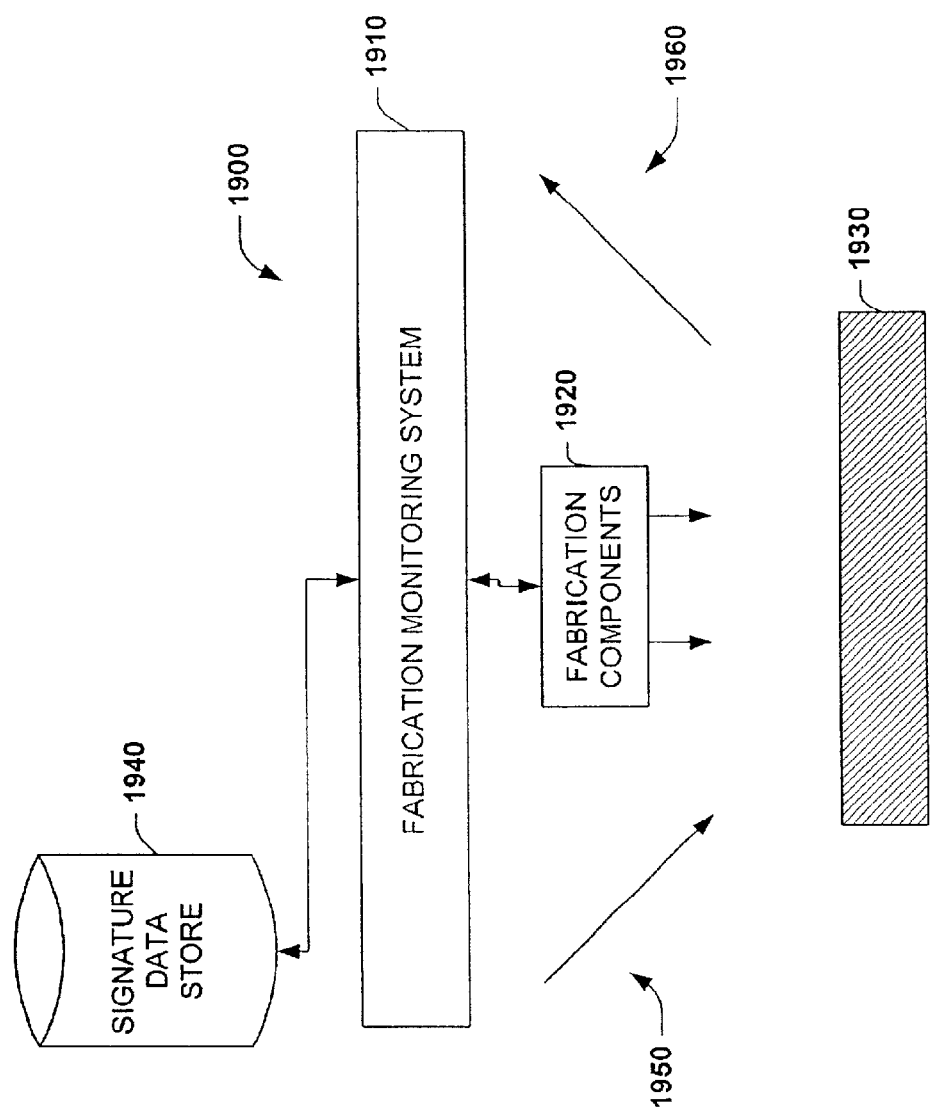
FIG. 19 is a schematic block diagram of a system for monitoring and controlling a fabrication process in accordance with an aspect of the present invention.

Referring now to FIG. 19, a system 1900 for monitoring and controlling a fabrication process is illustrated. Such fabrication processes may be employed, for example, in depositing layers on a wafer, etching features, developing and hardening a pattern in a photoresist, and the like, each of which may produce stresses on a wafer and/or wafer layer that can lead to distortion (e.g., bow, warp, horizontal stretching/compression/shifting, vertical stretching/compression/shifting). Fabrication rates may vary in response to factors including, but not limited to, formulae, concentrations, temperatures, pressures, atmospheres, wafer to wafer variations and feature density on a wafer and thus distortion rates may vary widely. Conventional techniques to measure stresses and/or distortions do not provide direct information from in-situ measurements. Thus, due to the number and character of factors affecting the fabrication process, such conventional techniques may not provide adequate monitoring and/or control opportunities for fabrication processes.

The system 1900 includes a fabrication monitoring system 1910 that can be employed to direct a light 1950 at a wafer 1930 to which one or more fabrication processes will be applied. The fabrication monitoring system 1910 can be a standalone device and/or can also be distributed between two or more cooperating devices and/or processes. Similarly, the fabrication monitoring system 1910 can reside in one physical or logical device (e.g., computer, process) and/or be distributed between two or more physical or logical devices. The fabrication monitoring system 1910 may include one or more components that are located inside a process chamber (e.g., a spin track, stepper motor) and/or one or more components that are not located inside a process chamber.

The light 1950 may be generated by many different light sources, and in one example aspect of the present invention the light 1950 is generated by a frequency-stabilized laser. The fabrication monitoring system may direct the light 1950 at substantially all of the wafer 1930 and/or at selected portions of the wafer (e.g., gratings). By way of illustration, in one example aspect of the present invention, the light 1950 may be directed at selected portions of the wafer 1930, where such portions provide data sufficient to generate scatterometry signatures. A light 1960 reflected from the wafer 1930 is collected by the fabrication monitoring system 1910, which may then employ scatterometry techniques to analyze the reflected light 1960 to monitor one or more fabrication processes. For example, the location of lines in a grating may be analyzed to determine whether unacceptable distortion (e.g., stretching, compression, shifting) has occurred and thus whether fabrication should be allowed to proceed, terminated and/or adapted.

It is to be appreciated that the surface of the wafer 1930, which may include features in a pattern being developed, can both reflect and refract the light 1950, so that the light 1960 can be a complex reflected and/or refracted light. The scatterometry analysis can include comparing one or more scatterometry signatures associated with the reflected light 1960 to one or more scatterometry signatures stored in a signature data store 1940. Such signatures may be generated, for example, by combining phase and/or intensity information associated with the reflected light 1960. As fabrication progresses, light reflecting from a wafer 1930 may produce various signatures. The sequence in which such signatures are generated can be employed to monitor fabrication progress. For example, at a first point in time T1, light reflected from the wafer 1930 may produce a signature SI that indicates that lines with a first width W1 and depth D1 have been produced at a first location L1. At a second point in time T2, light reflected from the wafer 1930 may produce a signature S2 that indicates that lines with a second width W2 and depth D2 have been produced at a second location L2 and at a third point in time T3, light reflected from the wafer 1930 may produce a signature S3 that indicates that lines with a third width W3 and depth D3 have been produced at a third location L3. Analyzing the sequence of signatures, and the time required to produce transitions between such signatures can facilitate determining whether fabrication is progressing at an acceptable rate and/or in an acceptable manner. Feedback information can be generated from such sequence analysis to maintain, increase and/or decrease the rate at which fabrication progresses.

The signature data store 1940 can store data in data structures including, but not limited to one or more lists, arrays, tables, databases, stacks, heaps, linked lists and data cubes. The signature data store 1940 can reside on one physical device and/or may be distributed between two or more physical devices (e.g., disk drives, tape drives, memory units).

Figure 20:
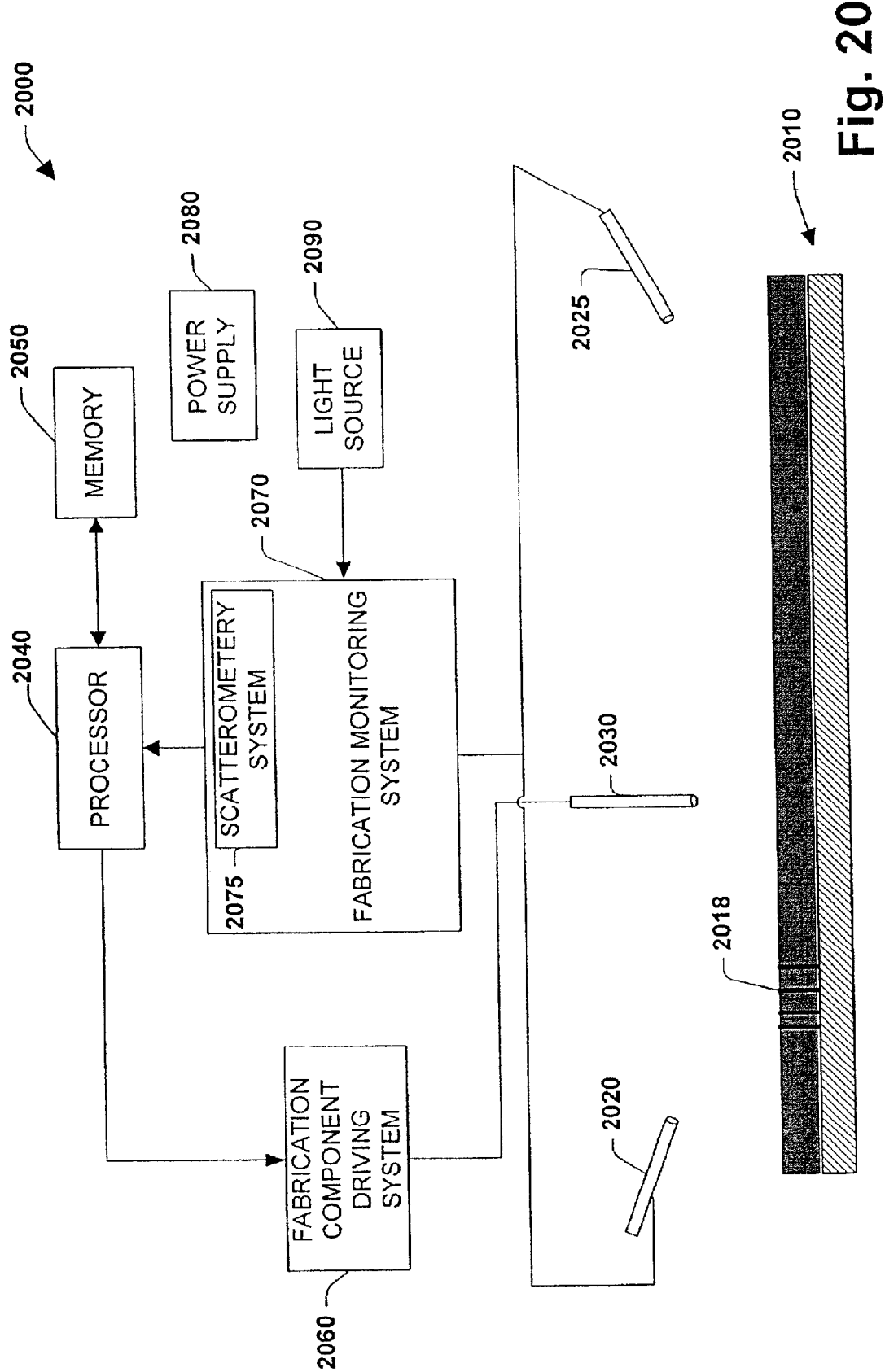
FIG. 20 is schematic block diagram of a fabrication process monitoring and controlling system in accordance with an aspect of the present invention.

FIG. 20 illustrates a system 2000 for monitoring and controlling fabrication processes. The system 2000 operates to control one or more fabrication components 2030 in order to monitor and/or control a fabrication process (e.g., deposition, annealing, etching, developing, etc.). A fabrication monitoring system 2070, a processor 2040 and a fabrication component driving system 2060 work cooperatively to control one or more fabrication components 2030.

The fabrication components 2030 are coupled to and controlled directly by the fabrication component driving system 2060. The fabrication component driving system 2060 receives information and/or instructional commands from the processor 2040. The processor 2040 determines the content and type of information transmitted to the fabrication component driving system 2060 according to its analysis of data received from and collected by the monitoring system 2070. Thus, through the interaction of components 2030, 2070, 2040 and 2060, the system 2000 has the ability to adapt an underway fabrication process. In one example of the present invention, through machine learning, the system 2000 may automatically improve subsequent fabrication processes for similar wafers and/or layers. In addition, by communicating measurements relating to recently fabricated patterns/wafers to the processor 2040, the processor 2040 can control the fabrication component driving system 2060, which can thus regulate the one or more fabrication components 2030 to facilitate obtaining more precise and improved fabrication processes.

The system 2000 includes one or more target light sources 2020 to project light onto respective portions of the wafer 2010 and/or a grating 2018 on the wafer 2010. A portion of the wafer 2010 may have one or more gratings 2018 and/or features located on that portion. Light reflected and/or refracted by the one or more gratings 2018 is collected by one or more light detecting components 2025, and processed by a fabrication monitoring system 2070 to measure at least one parameter relating to the fabrication of integrated circuits on the wafer 2010. For example, spaces between portions of the grating 2018 can be measured and compared to desired critical dimensions (CDs). The reflected light is measured with respect to the incident light in order to obtain the various parameters relating to the gratings 2018.

The monitoring system 2070 may include a scatterometry system 2075. It is to be appreciated that any suitable scatterometry system may be employed to carry out the present invention, and such systems are intended to fall within the scope of the claims appended hereto.

A light source 2090 (e.g., a laser) provides light to the one or more target light sources 2020 via the monitoring system 2070. Preferably, the light source 2090 is a frequency-stabilized laser, however, it will be appreciated that any laser or other light source (e.g., laser diode or helium neon (HeNe) gas laser) suitable for carrying out the present invention may be employed. One or more light detecting components 2025 (e.g., photo detector, photo diodes) collect light reflecting from, or refracted by the one or more gratings 2018. The monitoring system 2070 may also process the measured light data into a data form compatible with or understandable to the processor 2040.

The processor 2040 is operatively coupled to the monitoring system 2070 and receives the measured grating data from the monitoring system 2070. The processor 2040 determines distortion measurements and the acceptability and/or progress of the fabrication of respective portions of the wafer 2110 by examining grating measurements and comparing such grating measurement values to stored acceptable and unacceptable values. The values may be associated with one or more signatures stored, for example, in a memory 2050. In determining the acceptability and/or progress of an on-going and/or recently completed fabrication process, the processor 2040 may also determine to what extent, if any, adjustments to the fabrication components 2030 may be attempted to optimize subsequent fabrication processes. Upon making the determination, the processor 2040 transmits this information to the fabrication component driving system 2060, which then makes one or more adjustments to the fabrication components 2030.

As described above, the processor 2040 is also coupled to the fabrication component driving system 2060 that directs and controls the one or more fabrication components 2030 (e.g., temperature controllers, pressure controllers, formulae controllers, concentration controllers, etc.). In one example of the present invention, the fabrication component driving system 2060 is controlled, at least in part, by the processor 2040 to selectively vary the operation of the respective fabrication components 2030. Respective portions of the wafer 2010 are associated with one or more corresponding fabrication components 2030. The processor 2040 monitors the development of one or more patterns and/or one or more gratings 2018, and selectively regulates the corresponding fabrication components 2030. The transmission and relay of information between the monitoring system 2070, the processor 2040, the fabrication component driving system 2060 and the fabrication components 2030 creates effective feedback control that facilitates improving IC quality by producing more precisely fabricated features with less distortion.

The processor 2040, or central processing unit, may be any of a plurality of processors, such as the AMD K7, the AMD Athlon and other similar and compatible processors. The processor 2040 is programmed to control and operate the various components within the system 2000 in order to carry out the various functions described herein. The manner in which the processor 2040 is programmed to carry out the functions relating to the present invention will be apparent based on the description provided herein.

A memory 2050, which is operatively coupled to the processor 2040, is also included in the system 2000 and serves to store, among other things, program code executed by the processor 2040 for carrying out operating functions of the system 2000 as described herein. For example, the memory 2050 can hold patterns to which observed data can be compared. The memory 2050 also serves as a storage medium for temporarily storing data such as distortion measurements, fabrication progress values, fabrication progress tables, component coordinate tables, grating sizes, grating shapes, scatterometry information, achieved CDs, desired CDs and other data that may be employed in carrying out the present invention.

A power supply 2080 provides operating power to the system 2000. Any suitable power supply (e.g., battery, line power) may be employed to carry out the present invention.

Figure 21:
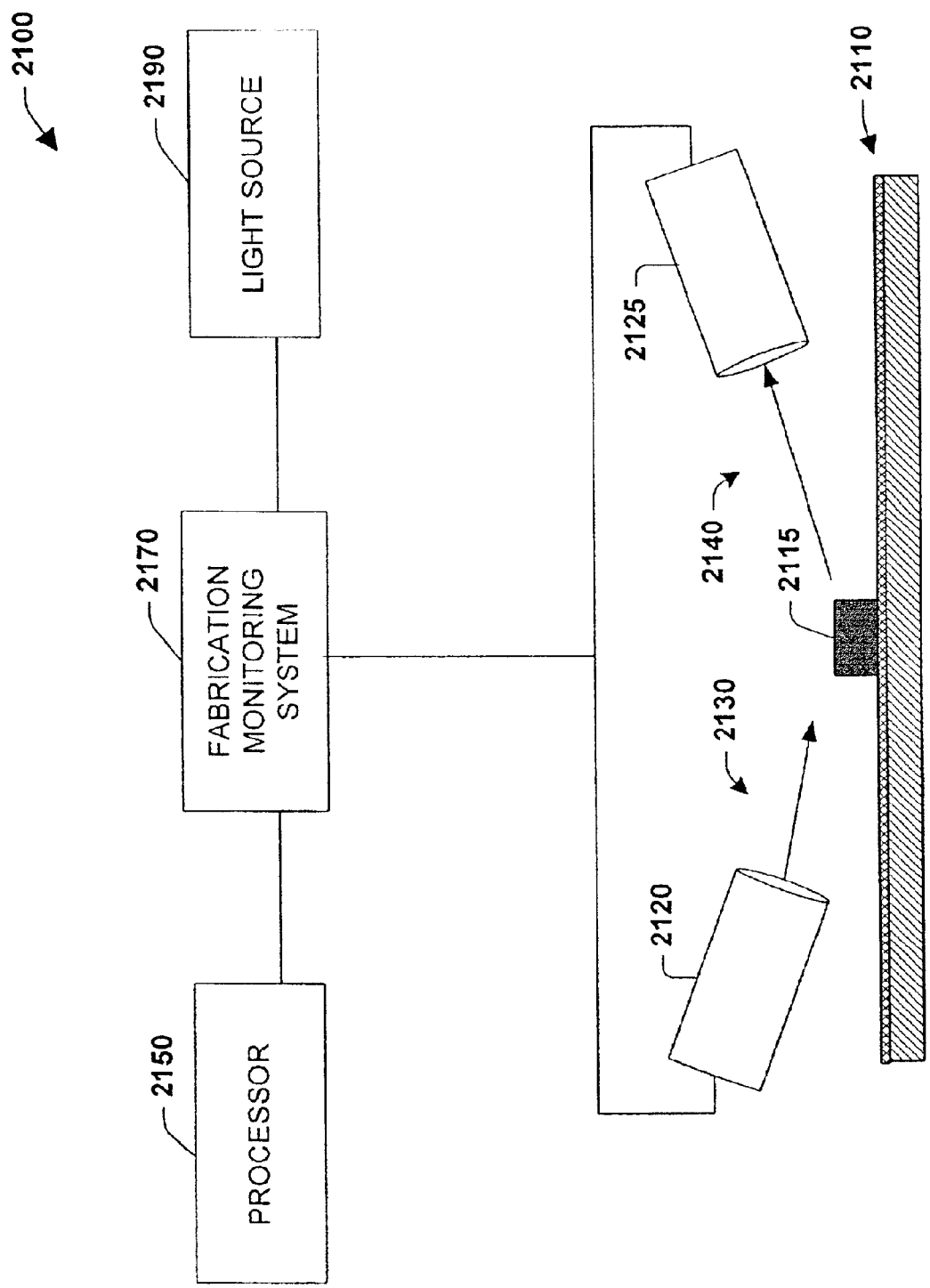
FIG. 21 is a partial schematic block diagram of the system of FIG. 20 being employed in connection with monitoring and/or controlling a fabrication process by measuring grating distortion in accordance with an aspect of present invention.

FIG. 21 illustrates a system 2100 being employed to monitor and/or control the fabrication of a particular portion of a wafer 2110. A target light source 2120 directs a light 2130 incident to the surface of the wafer 2110. The light 2130 may be referred to as the reference beam, and thus the phase, intensity, angle and/or polarization of the reference beam 2130 may be recorded in the fabrication monitoring system 2170 to facilitate later comparisons to a reflected beam 2140. The angle of the reflected light 2140 will vary in accordance with the evolving dimensions of a grating 2115, and/or with the evolving dimensions of one or more patterns being developed in the wafer 2110. Similarly, the intensity and phase properties of the specularly reflected light 2140 may vary in accordance with the evolving dimensions. The one or more light detecting components 2125 collect the reflected light 2140 and transmit the collected light, and/or data associated with the collected light, to the monitoring system 2170. The monitoring system 2170 collects the reflected light 2140, and/or related data, in accordance with scatterometry techniques. The monitoring system 2170 then provides the processor 2150 with data corresponding to the fabrication characteristics associated with the wafer 2110. The data may include, for example, information relating to distortion (e.g., horizontal/vertical compression/stretching/shifting) as well as other measurements relating to the fabrication process.

In another aspect of the invention, the data may also include conclusory information including, but not limited to, whether desired dimensions have been reached and whether development should continue, whether desired CDs are being achieved in a timely fashion and thus whether adjustments are required and whether measured dimensions are within a pre-determined range.

The monitoring system 2170 provides direct, real-time measurements as opposed to measurements taken according to pre-determined system schedules and measurements taken post-fabrication. Providing direct, real-time feedback facilitates selective control of fabrication processes and improved precision over conventional methods and/or apparatus.

Figure 22:
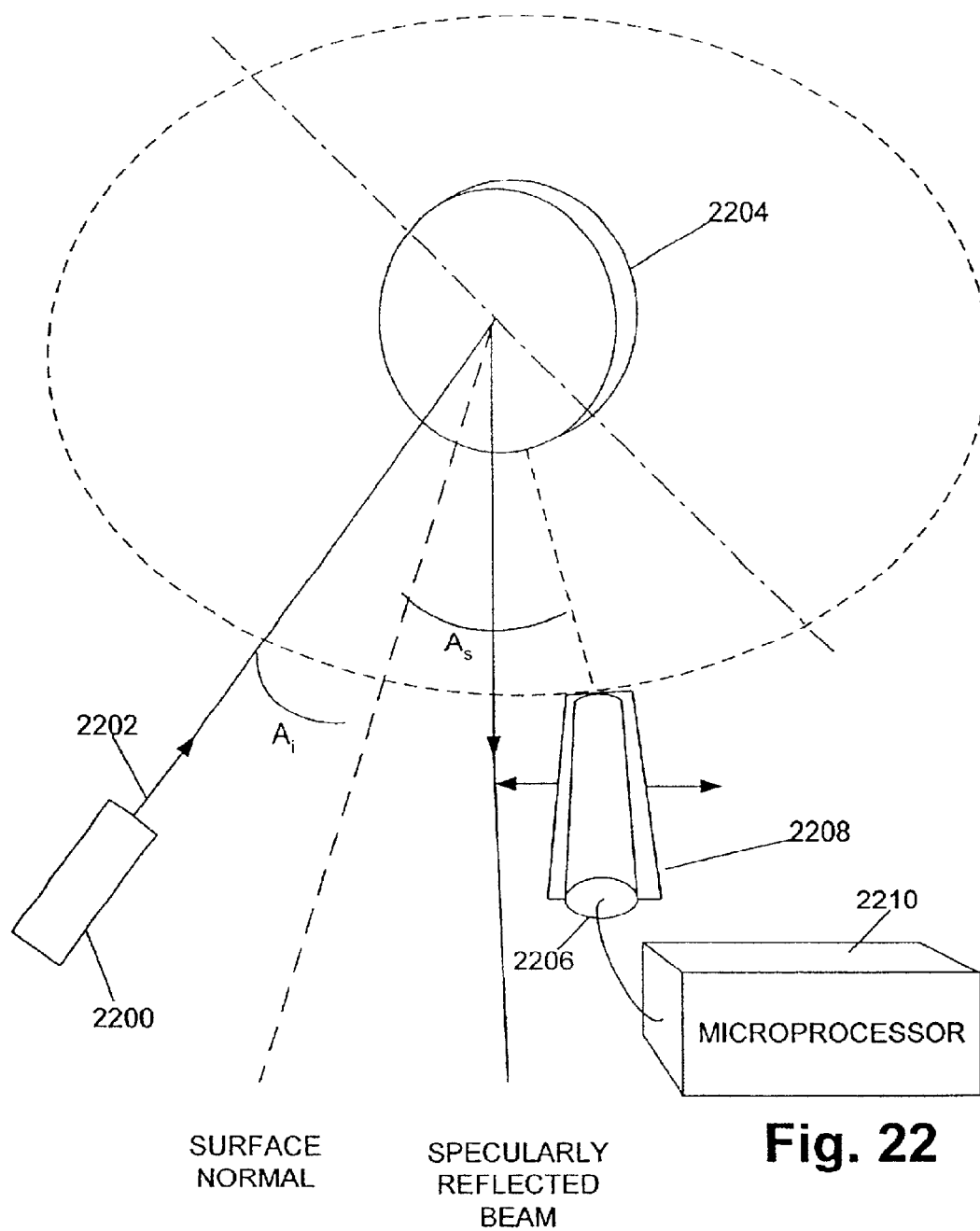
FIG. 22 illustrates an exemplary scatterometry system collecting reflected light in accordance with an aspect of the present invention.

FIG. 22 illustrates an exemplary scatterometry system collecting reflected light. Light from a laser 2200 is brought to focus in any suitable well-known manner to form a beam 2202. A sample, such as a wafer 2204, is placed in the path of the beam 2202 and a photo detector or photo multiplier 2206 of any suitable well-known construction. Different detector methods may be employed to determine the scattered and/or reflected power. To obtain a grating pitch, the photo detector or photo multiplier 2206 may be mounted on a rotation stage 2208 of any suitable well-known design. A microprocessor 2210, of any suitable well-known design, may be used to process detector readouts, including, but not limited to, intensity properties of the specularly reflected light, phase properties of the specularly reflected light, and angular locations of different diffracted orders leading to diffraction grating pitch calculations. Thus, light reflected from the sample 2204 may be accurately measured.

Figure 23:
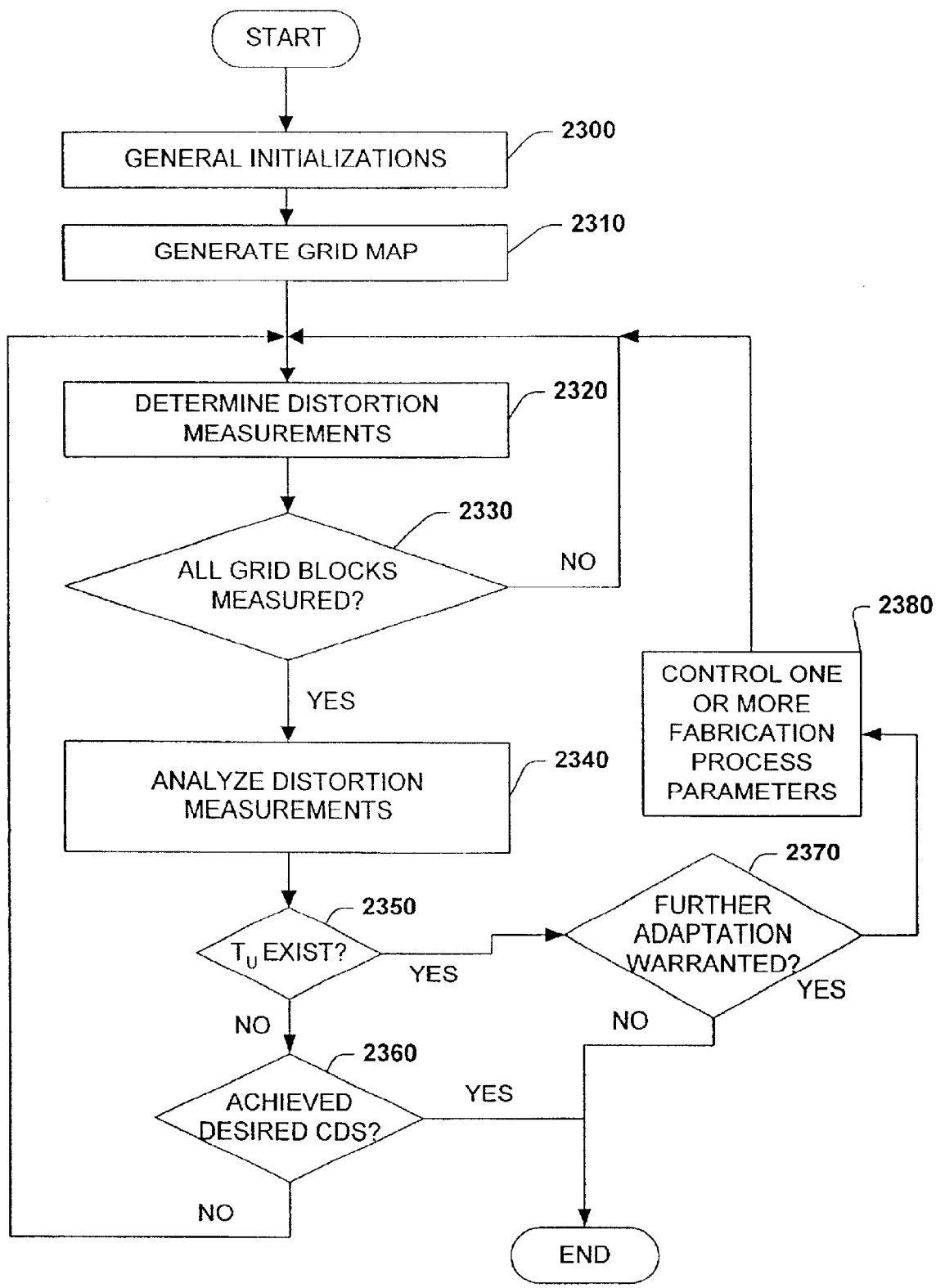
FIG. 23 is a flow diagram illustrating one specific methodology for carrying out the present invention.

In view of the exemplary systems shown and described above, methodologies that may be implemented in accordance with the present invention will be better appreciated with reference to the flow diagram of FIG. 23. While for purposes of simplicity of explanation, the methodology of FIG. 23 is shown and described as a series of blocks, it is to be understood and appreciated that the present invention is not limited by the order of the blocks, as some blocks may, in accordance with the present invention, occur in different orders and/or concurrently with other blocks from that shown and described herein. Moreover, not all illustrated blocks may be required to implement a methodology in accordance with the present invention.

FIG. 23 is a flow diagram illustrating one particular methodology for carrying out the present invention. At 2300, general initializations are performed. Such initializations can include, but are not limited to, establishing pointers, allocating memory, setting variables and establishing communication channels. At 2310, a grid map of one or more grid blocks "XY" is created. At 2320, distortion measurements and/or fabrication progress determinations are made with respect to the various wafer portions mapped by the respective grid blocks XY. At 2330, a determination is made concerning whether all grid block measurements have been taken. If the determination at 2330 is NO, then processing returns to 2320. If the determination at 2330 is YES, then at 2340, distortion measurements and/or fabrication progress values are analyzed and compared against acceptable values and measurements for the respective portions of a wafer. In an alternative example of the present invention, the determination at 2330 may concern whether a sufficient number of grid blocks have been measured to facilitate valid CD analysis.

At 2350, a determination is made concerning whether distortion values and/or fabrication progress values are acceptable. If such values are acceptable, then processing continues at 2360 where a determination is made concerning whether desired CDs have been achieved. If desired CDs have been achieved, then processing can conclude. Otherwise, processing continues at 2320. If unacceptable values are found at 2350, processing proceeds to 2370 where a determination is made concerning whether further adaptation is warranted. By way of illustration, the unacceptable values may indicate that portions of the wafer and/or the entire wafer being processed have been damaged (e.g., distorted) by stress to such an extent that further adaptations to the fabrication process are unwarranted. Such a damaged portion and/or wafer may be marked for discard. By way of further illustration, analysis of the unacceptable values may indicate that a simple adaptation is appropriate, which may facilitate minimizing wafer discard. The present iteration is then ended and the process returns to 2320 to perform another iteration.

Turning now to FIGS. 24–26, another aspect of the present invention is shown. In addition to the methods described above, a wafer 2410 may be logically partitioned into grid blocks to facilitate examining fabrication progress and stress positions or locations on the wafer 2410. Obtaining such positions or locations may facilitate determining to what extent, if any, fabrication process adjustments are necessary and/or may facilitate determining the presence and/or extent of stress distortion (e.g., bow, warp, horizontal/vertical stretch/compression/shifting). Obtaining such information may also assist in determining problem areas associated with fabrication processes.

FIG. 24 illustrates a perspective view of a chuck 2430 supporting the wafer 2410, whereupon one or more gratings may be formed. The wafer 2410 may be divided into a grid pattern as shown in FIG. 25. Each grid block (XY) of the grid pattern corresponds to a particular portion of the wafer 2410, and each grid block is associated with one or more gratings and/or one or more portions of one or more gratings. The grid blocks are individually monitored for fabrication progress and distortion measurements. It is to be appreciated that the size and/or shape of gratings can be manipulated to facilitate analyzing different critical dimensions. For example, for a particular layer in an integrated circuit, a CD relating to a width between features may be important. Thus, the gratings can be patterned to optimize analyzing the width between features.

In FIG. 25, one or more gratings in the respective portions of the wafer 2410 ($X_1Y_1 \ldots X_{12}, Y_{12}$) are monitored for distortion measurements produced during the fabrication process using reflected light, the monitoring system 2070 (FIG. 20) and the processor 2040 (FIG. 20). Exemplary distortion measurements produced during fabrication for each grating are shown. As can be seen, the distortion measurement at coordinate $X_7Y_6$ is substantially higher than the distortion measurement of the other portions XY. It is to be appreciated that the wafer 2410 may be mapped into any suitable number of grid blocks (e.g., one grid block, one hundred grid blocks, one hundred and forty four grid blocks), and any suitable number of gratings (e.g., one grating, ten gratings) may formed on the wafer 2410. Although the present invention is described with respect to one fabrication component 2030 (FIG. 20) corresponding to one grid block XY, it is to be appreciated that any suitable number of fabrication components 2030 (FIG. 20) corresponding to any suitable number of wafer portions/grid blocks may be employed.

FIG. 26 is a representative table of distortion measurements taken for the various grid blocks that have been correlated with acceptable distortion values for the portions of the wafer 2410 mapped by the respective grid blocks. As can be seen, all the grid blocks, except grid block $X_7Y_6$, have distortion measurements corresponding to an acceptable distortion table value ($T_A$) (e.g., are within an expected range of distortion measurements), while grid block $X_7Y_6$ has an undesired distortion table value ($T_U$). Thus, it has been determined that an undesirable fabrication condition exists at the portion of the wafer 2410 mapped by grid block $X_7Y_6$. Accordingly, fabrication process parameters may be adjusted to attempt to adapt the fabrication process. Alternatively, a sufficient number of grid blocks may have desirable distortion measurements so that the single offensive grid block does not warrant scrapping the entire wafer. It is to be appreciated that fabrication process parameters may be adapted so as to maintain, increase, decrease and/or qualitatively change the fabrication of the respective portions of the wafer 2410 as desired. When the fabrication process has reached a pre-determined threshold level (e.g., X % of grid blocks have acceptable CDs and acceptable distortion measurements), a fabrication step may be terminated, thus enabling more precise control of the fabrication process, which provides advantages over conventional systems.

Turning now to FIGS. 27–32, the concepts of scatterometry and how they are employed in the present invention are discussed. Scatterometry is a technique for extracting information about a surface upon which an incident light has been directed. Scatterometry is a metrology that relates the geometry of a sample to its scattering effects. Scatterometry is based on the reconstruction of a grating profile from its optical diffraction responses. Scatterometry can be employed to acquire information concerning properties including, but not limited to, horizontal/vertical shifting/compression/stretching, dishing, erosion, profile, thickness of thin films and critical dimensions of features present on a surface. The information can be extracted by comparing the phase and/or intensity of a reference light directed onto the surface with phase and/or intensity signals of a complex reflected and/or diffracted light resulting from the incident light reflecting from and/or diffracting through the surface upon which the incident light was directed. The intensity and/or the phase of the reflected and/or diffracted light will change based on properties of the surface upon which the light is directed. Such properties include, but are not limited to, the location of gratings on the surface, distortion of gratings on the surface, the chemical properties of the surface, the planarity of the surface, features on the surface, voids in the surface, and the number and/or type of layers beneath the surface. In the present invention, the phase and/or intensity of the reflected and/or diffracted light will be examined as it relates to distortion measurements desired on the wafer being fabricated.

Different combinations of the above-mentioned properties will have different effects on the phase and/or intensity of the incident light resulting in substantially unique intensity/phase signatures in the complex reflected and/or diffracted light. Thus, by examining a signal (signature or stored value) library of intensity/phase signatures, a determination can be made concerning the properties of the surface. Such substantially unique intensity/phase signatures are produced by light reflected from and/or refracted by different surfaces due, at least in part, to the complex index of refraction of the surface onto which the light is directed. The complex index of refraction (N) can be computed by examining the index of refraction (n) of the surface and an extinction coefficient (k). One such computation of the complex index of refraction can be described by the equation:

$N=n-jk$, where $j$ is an imaginary number.

The signal (signature) library can be constructed from observed intensity/phase signatures and/or signatures generated by modeling and simulation. By way of illustration, when exposed to a first incident light of known intensity, wavelength and phase, a first grating on a wafer can generate a first intensity/phase signature. Similarly, when exposed to the first incident light of known intensity, wavelength and phase, a second grating on a wafer can generate a second intensity/phase signature. For example, a line of a first width may generate a first signature while a line of a second width may generate a second signature. Observed signatures can be combined with simulated and modeled signatures to form the signal (signature) library. Simulation and modeling can be employed to produce signatures against which measured intensity/phase signatures can be matched. In one exemplary aspect of the present invention, simulation, modeling and observed signatures are stored in a signal (signature) library containing over three hundred thousand intensity/phase signatures. Thus, when the intensity/phase signals are received from scatterometry detecting components, the intensity/phase signals can be pattern matched, for example, to the library of signals to determine whether the signals correspond to a stored signature.

Figure 27:
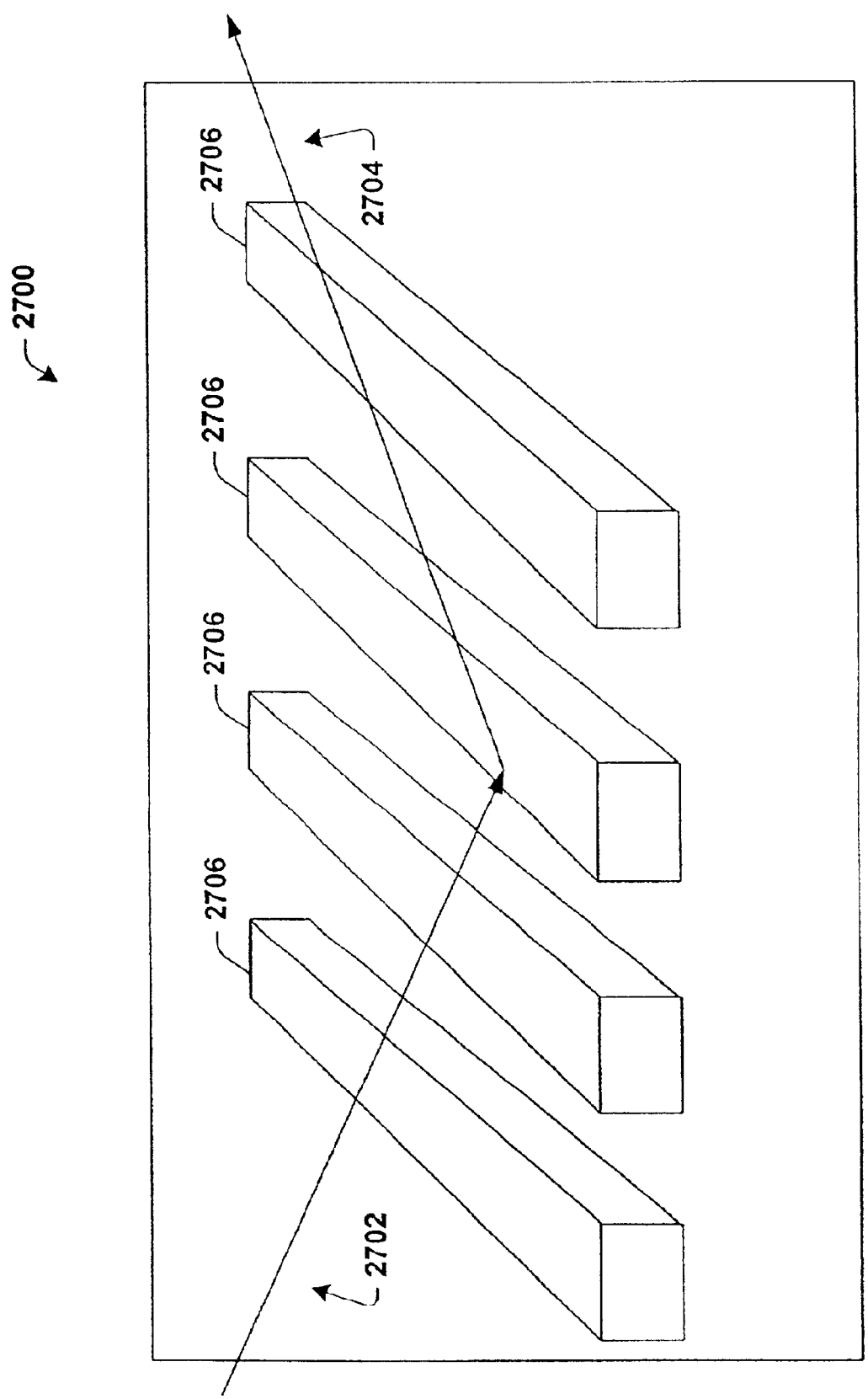
FIG. 27 is a simplified perspective view of an incident light reflecting off a surface, in accordance with an aspect of the present invention.

To illustrate the principles described above, reference is now made to FIGS. 27 through 32. Referring initially to FIG. 27, an incident light 2702 is directed at a surface 2700, upon which one or more features (e.g., gratings) 2706 may exist. The incident light 2702 is reflected as reflected light 2704. The properties of the surface 2700, including but not limited to, thickness, uniformity, planarity, chemical composition and the presence of features, can affect the reflected light 2704. The features 2706 are raised upon the surface 2700. The phase and/or intensity of the reflected light 2704 can be measured and plotted, as partially shown, for example, in FIG. 32. Such plots can be employed to compare measured signals with signatures stored in a signature library using techniques like pattern matching, for example.

Figure 28:
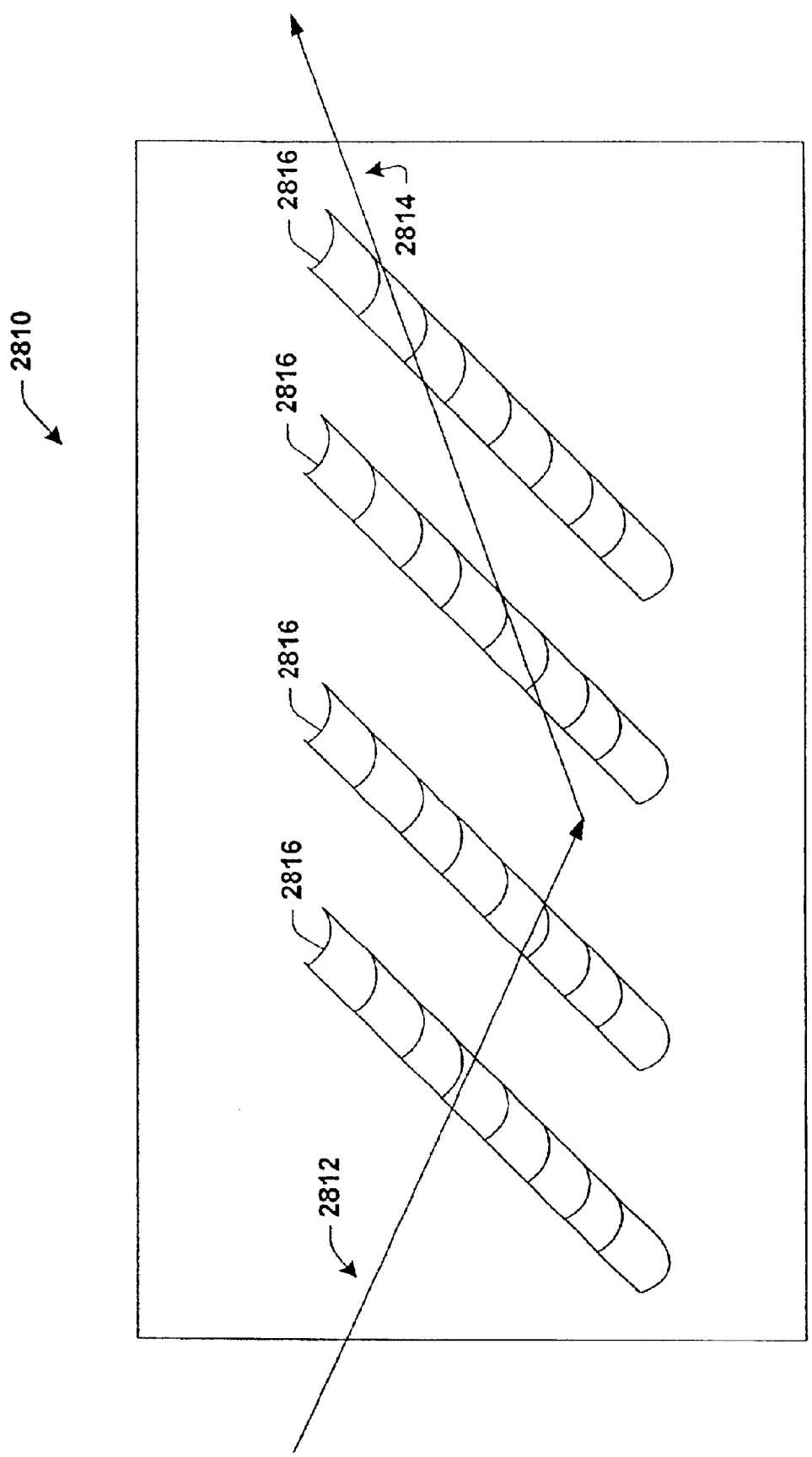
FIG. 28 is a simplified perspective view of an incident light reflecting off a surface, in accordance with an aspect of the present invention.

Referring now to FIG. 28, an incident light 2812 is directed onto a surface 2810 upon which one or more depressions 2816 appear. The incident light 2812 is reflected as reflected light 2814. Like the one or more features 2706 (FIG. 27) may affect an incident beam, so too may the one or more depressions 2816 affect an incident beam. Thus, it is to be appreciated that scatterometry can be employed to measure features appearing on a surface, features appearing in a surface, features emerging in a pattern, and properties of a surface itself, regardless of features.

Figure 29:
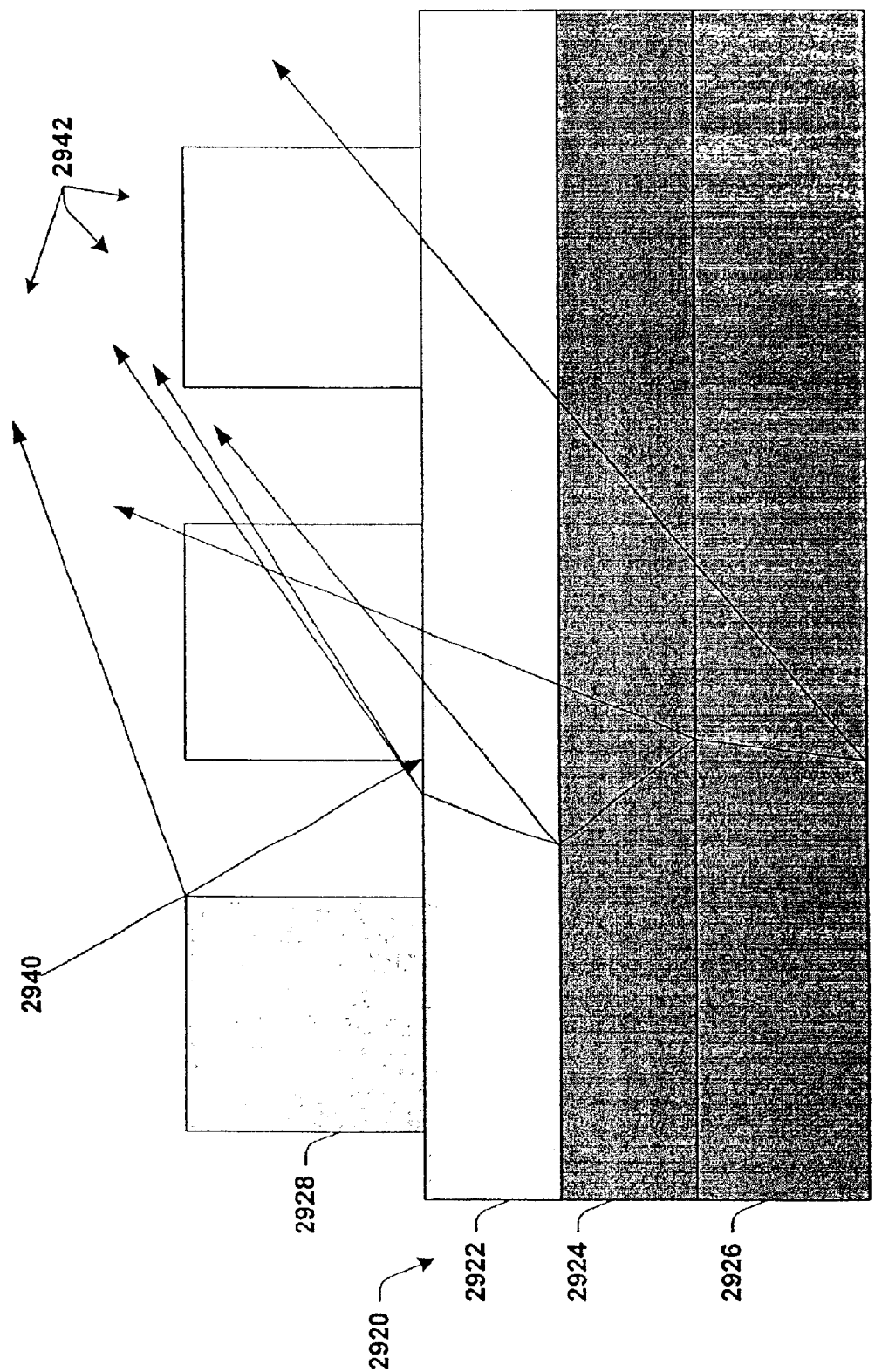
FIG. 29 illustrates a complex reflected and refracted light produced when an incident light is directed onto a surface, in accordance with an aspect of the present invention.

Turning now to FIG. 29, complex reflections and refractions of an incident light 2940 are illustrated. The reflection and refraction of the incident light 2940 can be affected by factors including, but not limited to, the presence of one or more features 2928, and the composition of the substrate 2920 upon which the features 2928 reside. For example, properties of the substrate 2920 including, but not limited to the thickness of a layer 2922, the chemical properties of the layer 2922, the opacity and/or reflectivity of the layer 2922, the thickness of a layer 2924, the chemical properties of the layer 2924, the opacity and/or reflectivity of the layer 2924, the thickness of a layer 2926, the chemical properties of the layer 2926, and the opacity and/or reflectivity of the layer 2926 can affect the reflection and/or refraction of the incident light 2940. Thus, a complex reflected and/or refracted light 2942 may result from the incident light 2940 interacting with the features 2928, and/or the layers 2922, 2924 and 2926. Although three layers 2922, 2924 and 2926 are illustrated in FIG. 29, it is to be appreciated that a substrate can be formed of a greater or lesser number of such layers.

Figure 30:
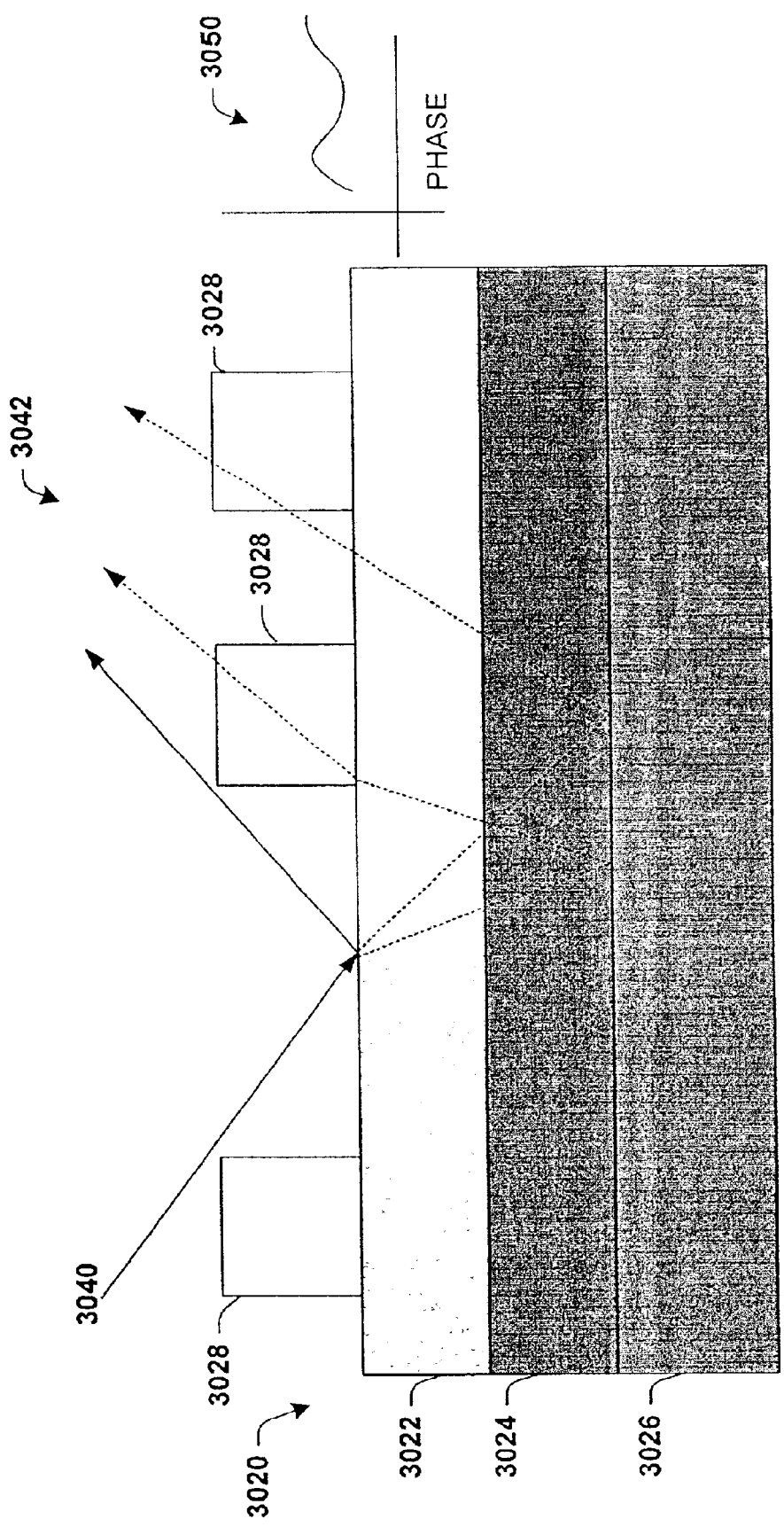
FIG. 30 illustrates a complex reflected and refracted light produced when an incident light is directed onto a surface, in accordance with an aspect of the present invention.
Figure 31:
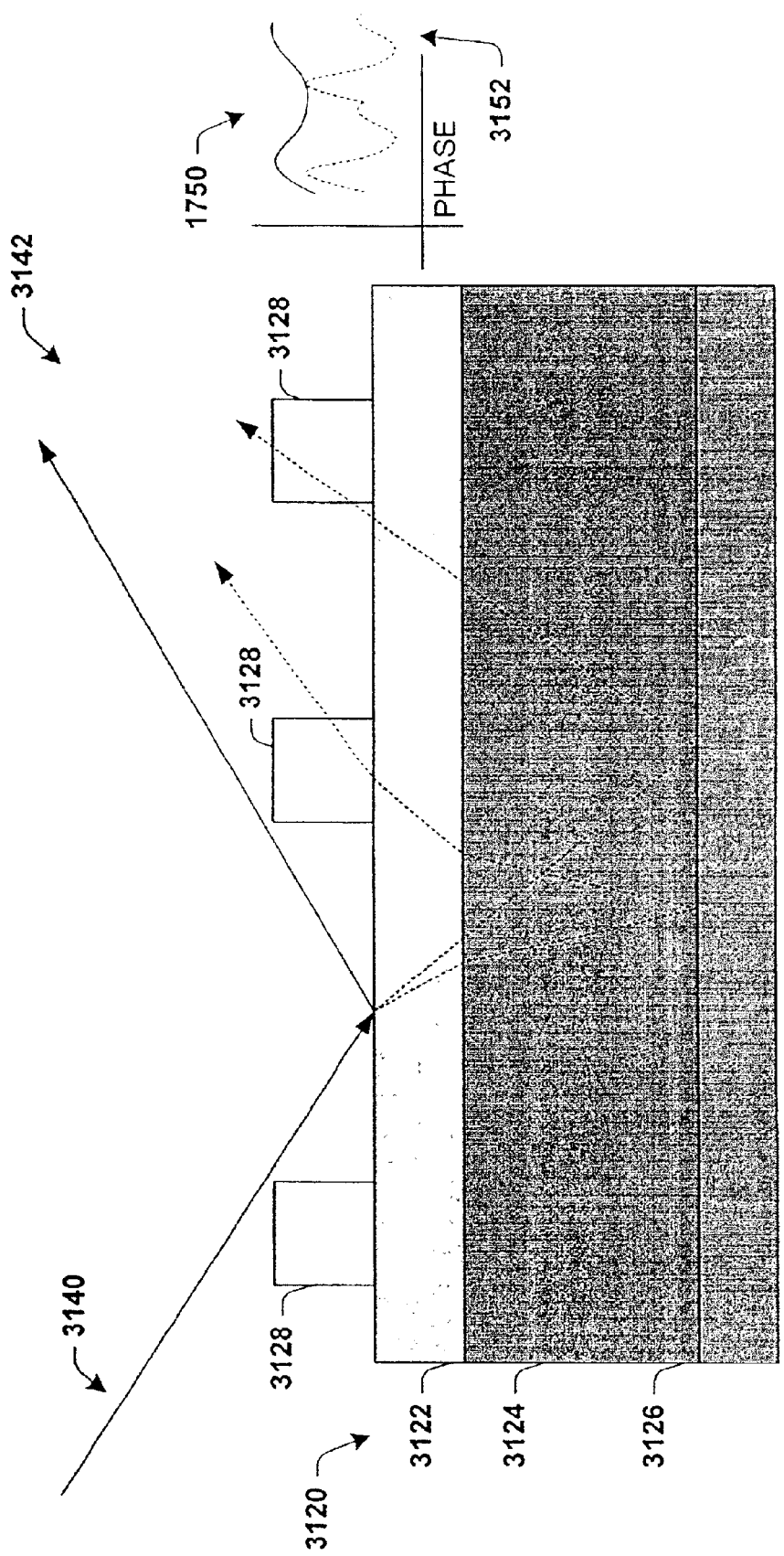
FIG. 31 illustrates a complex reflected and refracted light produced when an incident light is directed onto a surface, in accordance with an aspect of the present invention.
Figure 32:
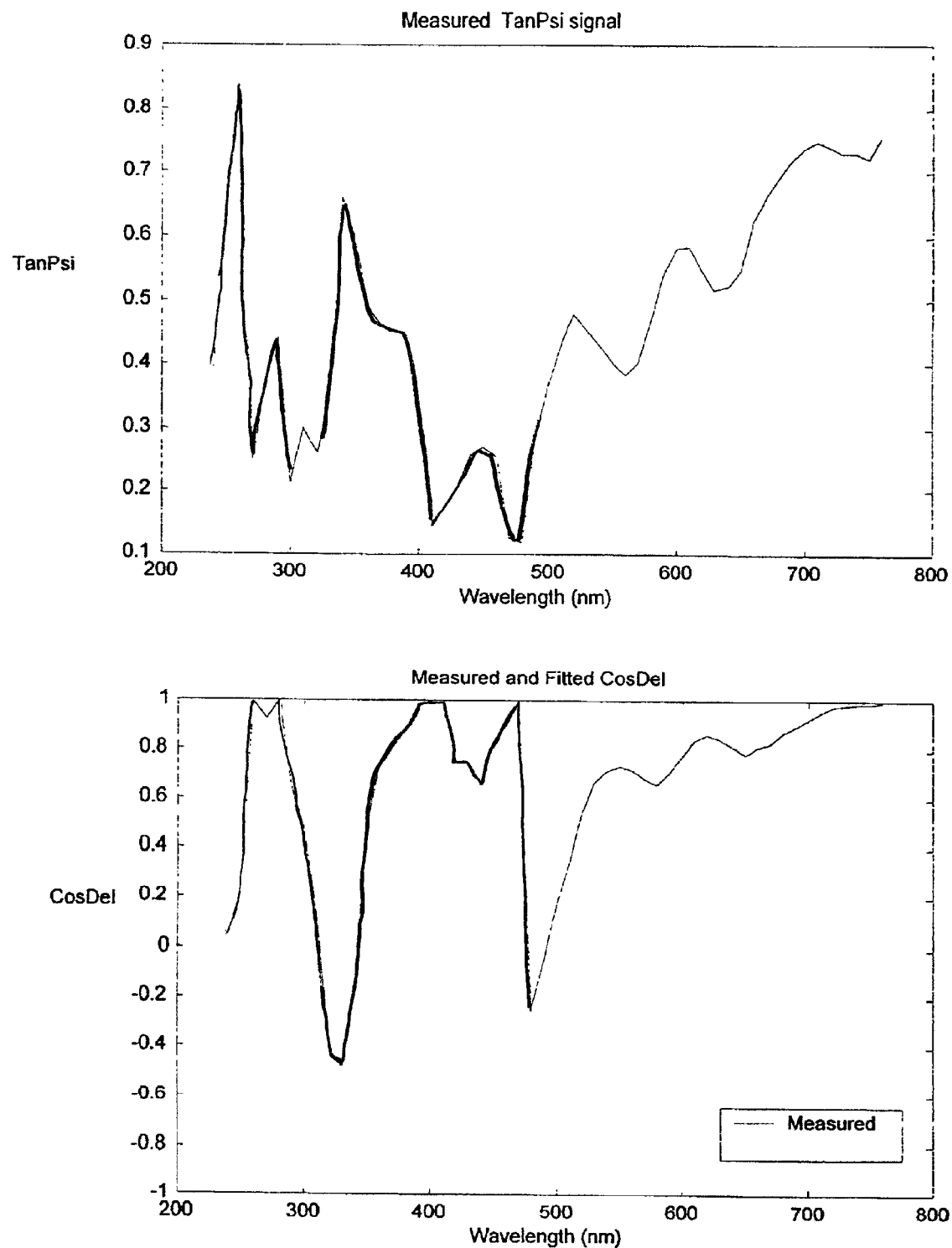
FIG. 32 illustrates phase and/or intensity signals recorded from a complex reflected and refracted light produced when an incident light is directed onto a surface, in accordance with an aspect of the present invention.

Turning now to FIG. 30, one of the properties from FIG. 29 is illustrated in greater detail. The substrate 3020 can be formed of one or more layers 3022, 3024 and 3026. The phase 3050 of the reflected and/or refracted light 3042 can depend, at least in part, on the thickness of a layer, for example, the layer 3024. Thus, in FIG. 31, the phase 3152 of the reflected light 3142 differs from the phase 3050 due, at least in part, to the different thickness of the layer 3124 in FIG. 31.

Thus, scatterometry is a technique that can be employed to extract information about a surface upon which an incident light has been directed. The information can be extracted by analyzing phase and/or intensity signals of a complex reflected and/or diffracted light. The intensity and/or the phase of the reflected and/or diffracted light will change based on properties of the surface upon which the light is directed, resulting in substantially unique signatures that can be analyzed to determine one or more properties of the surface upon which the incident light was directed.

Using scatterometry in the present invention facilitates a relatively non-invasive approach to detecting distortion and thus to reproducing successful fabrication processes in subsequent development cycles while mitigating problems associated with distortion.

Described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for monitoring a fabrication process, comprising:
   a system for directing light toward one or more gratings located on at least one portion of a wafer;
   a fabrication monitoring system operable to measure light reflected from the one or more gratings and to produce a distortion measurement;
   a distortion measurement data store operable to store one or more distortion measurements; and
   a processor operatively coupled to the fabrication monitoring system where the processor receives the distortion measurement from the fabrication monitoring system and records the distortion measurement in the distortion measurement data store.

2. The system of claim 1, the fabrication monitoring system further comprising a scatterometry system for processing the light reflected from the one or more gratings.

3. The system of claim 1 further comprising:
   at least one fabrication component operable to perform one or more semiconductor fabrication steps on at least one portion of a wafer; and
   a fabrication component driving system for driving the at least one fabrication component.

4. The system of claim 3, the processor being operatively coupled to the scatterometry system, the processor analyzing a scatterometry data received from the scatterometry system and producing a feed-forward control data, the processor controlling, at least in part, the at least one fabrication component via the fabrication component driving system based, at least in part, on the feed-forward control data.

5. The system of claim 4 further comprising a scatterometry signature data store operable to store one or more scatterometry signatures, where the scatterometry signatures code information associated with one or more grating parameters.

6. The system of claim 5, where the one or more grating parameters comprise at least one of grating line width, grating line depth, grating line location, space between one or more grating lines, space between one or more gratings and grating location.

7. The system of claim 6, the processor logically mapping the wafer into one or more grid blocks and making a determination of the acceptability of a distortion measurement in the one or more grid blocks.

8. The system of claim 7, wherein the processor determines the existence of an unacceptable distortion measurement for at least a portion of the wafer based on comparing one or more distortion measurements to one or more stored distortion measurements.

9. The system of claim 8, where a distortion measurement records information associated with at least one of horizontal stretch, horizontal compression, horizontal shift, vertical stretch, vertical compression and vertical shift.

10. The system of claim 9, wherein the processor employs a non-linear training system in computing the feed-forward control data.

11. A method for monitoring a semiconductor fabrication process, the method comprising:
   logically partitioning a wafer into one or more portions;
   fabricating one or more gratings on the wafer;
   directing an incident light onto at least one of the one or more gratings;
   collecting a reflected light reflected from the at least one grating;
   measuring the reflected light to determine one or more distortion measurements associated with the at least one grating; and
   storing the one or more distortion measurements.

12. The method of claim 11 where the one or more distortion measurements record information associated with at least one of horizontal stretch, horizontal compression, horizontal shift, vertical stretch, vertical compression and vertical shift.

13. The method of claim 12, further comprising processing the reflected light in a scatterometry system.

14. The method of claim 13 further comprising:
   computing one or more fabrication process adjustments by comparing the one or more distortion measurements to one or more scatterometry signatures associated with one or more stored distortion measurements; and
   adjusting one or more fabrication processes based, at least in part, on the one or more fabrication process adjustments.

15. The method of claim 14 where computing the one or more fabrication process adjustments is based, at least in part, on data received from the scatterometry system.

16. The method of claim 15 further comprising:

employing one or more non-linear training processes to compute the one or more fabrication process adjustments.

17. A system for monitoring a semiconductor fabrication process, comprising:

means for partitioning a wafer into one or more grid blocks;

means for sensing distortion in at least one of the one or more grid blocks; and means for recording the distortion sensed in the at least one grid block.

18. The system of claim 17 further comprising:

means for controlling a fabrication process on a wafer portion; and means for selectively controlling the means for controlling fabrication.

* * * * *